(12) United States Patent
Komoda et al.

(10) Patent No.: US 6,753,196 B2
(45) Date of Patent: Jun. 22, 2004

(54) METHOD OF AND APPARATUS FOR MANUFACTURING FIELD EMISSION-TYPE ELECTRON SOURCE

(75) Inventors: Takuya Komoda, Sanda (JP); Tsutomu Ichihara, Hirakata (JP); Koichi Aizawa, Neyagawa (JP); Yoshiaki Honda, Souraku-gun (JP); Yoshifumi Watabe, Tondabayashi (JP); Takashi Hatai, Neyagawa (JP); Toru Baba, Shijonawate (JP)

(73) Assignee: Matsushita Electric Works, Ltd., Osaka (JP)

( * ) Notice: Subject to any disclaimer, the term of this patent is extended or adjusted under 35 U.S.C. 154(b) by 0 days.

(21) Appl. No.: 10/178,409

(22) Filed: Jun. 25, 2002

(65) Prior Publication Data

US 2003/0013215 A1 Jan. 16, 2003

(30) Foreign Application Priority Data

Jun. 26, 2001 (JP) .......................................... 2001-192573
Sep. 25, 2001 (JP) .......................................... 2001-290329

(51) Int. Cl.[7] .............................................. H01L 21/00
(52) U.S. Cl. ........................................ 438/20; 438/478
(58) Field of Search ................................. 438/20, 478

(56) References Cited

U.S. PATENT DOCUMENTS

| 6,249,080 B1 | 6/2001 | Komoda et al. |
| 6,285,118 B1 | 9/2001 | Hatai et al. |
| 6,498,426 B1 | 12/2002 | Watabe et al. |
| 6,583,578 B1 | 6/2003 | Ichihara et al. |
| 6,590,321 B1 | 7/2003 | Komoda et al. |

FOREIGN PATENT DOCUMENTS

| JP | 11329213 | 11/1999 |
| JP | 2000-100316 | 4/2000 |
| JP | 2000-100319 | 4/2000 |
| JP | 2001-222892 | 8/2001 |

OTHER PUBLICATIONS

English Language Abstract of JP 2000–100316.
English Language Abstract of JP 11–329213.
English Language Abstract of JP 2000–100319.
English Language Abstract of JP 2001–222892.

Primary Examiner—John Niebling
Assistant Examiner—Christopher Lattin
(74) Attorney, Agent, or Firm—Greenblum & Bernstein, P.L.C.

(57) ABSTRACT

An electron source 10 has an n-type silicon substrate 1, a drift layer 6 formed on one surface of the substrate 1, and a surface electrode 7 formed on the drift layer 6. A voltage is applied so that the surface electrode 7 becomes positive in polarity relevant to the substrate 1, whereby electrons injected from the substrate 1 into the drift layer 6 drift within the drift layer 6, and are emitted through the surface electrode 7. In a process for manufacturing this electron source 10, when the drift layer 6 is formed, a porous semiconductor layer containing a semiconductor nanocrystal is formed in accordance with anodic oxidation. Then, an insulating film is formed on the surface of each semiconductor nanocrystal. Anodic oxidation is carried out while emitting light that essentially contains a wavelength in a visible light region relevant to the semiconductor layer.

26 Claims, 17 Drawing Sheets

METHOD OF AND APPARATUS FOR MANUFACTURING FIELD EMISSION-TYPE ELECTRON SOURCE

The present application is based on Japanese Patent Application No. 2001-192573 and Japanese Patent Application No. 2001-290329 filed in Japan, the contents of which are fully incorporated herein.

BACKGROUND OF THE INVENTION

1. Field of the Invention

The present invention relates to a method of, and apparatus for, manufacturing a field emission-type electron source comprising a strong field drift layer so as to emit an electron beam by electric field emission.

2. Description of the Related Art

There is well known a field emission-type electron source (hereinafter, simply referred to as an "electron source") in which a strong field drift layer (hereinafter, simply referred to as a "drift layer") consisting of a porous semiconductor layer oxide (or nitride) is formed on one surface of an electrically conductive substrate, and a surface electrode is formed on the drift layer (for example, refer to Japanese Patent Application Publication No. 2966842, Japanese Patent Application Publication No. 2987140, and Japanese Patent Application Publication No. 3079086). As an electrically conductive substrate, for example, there are employed: a semiconductor substrate whose resistivity is comparatively close to conductivity of a conductor; a metal substrate; and a substrate having an electrically conductive layer formed on one surface of a glass substrate (insulating substrate) or the like.

For example, as shown in FIG. 26, in an electron source 10' of this type, a drift layer 6' consisting of an oxidized porous polycrystalline silicon layer is formed on a main surface of an n-type silicon substrate 1 that is an electrically conductive substrate. A surface electrode 7 is formed on the drift layer 6'. An ohmic electrode 2 is formed on a back face of the n-type silicon substrate 1. In an example shown in FIG. 26, a semiconductor layer 3 consisting of a non-doped polycrystalline silicon layer is interposed between the n-type silicon substrate 1 and the drift layer 6'. However, there is proposed an electron source having the drift layer 6' formed on the main surface of the n-type silicon substrate 1 without interposing the semiconductor layer 3.

In the electron source 10' shown in FIG. 26, electrons are emitted in accordance with the following process. First, a collector electrode 21 is disposed in opposite to the surface electrode 7. While vacuuming is provided between the surface electrode 7 and the collector electrode 21, a direct current voltage Vps is applied between the surface electrode 7 and the n-type silicon substrate 1 so that the surface electrode 7 becomes high in potential (positive polarity) relevant to the n-type silicon substrate 1 (ohmic electrode 2). On the other hand, a direct current voltage Vc is applied between the collector electrode 21 and the surface electrode 7 so that the collector electrode 21 becomes high in potential relevant to the surface electrode 7. When the direct current voltages Vps and Vc are properly set, electrons injected from the n-type silicon substrate 1 drift the drift layer 6', and is emitted trough the surface electrode 7 (the singly dotted chain line in FIG. 26 indicates the flow of an electron "e" emitted through the surface electrode 7). The surface electrode 7 is formed of a material with its small work function (for example, gold). The thickness of the surface electrode 7 is set to about 10 nm to 15 nm.

Here, a current flowing between the surface electrode 7 and the ohmic electrode 2 is referred to as a diode current Ips, and a current flowing between the collector electrode 21 and the surface electrode 7 is referred to as an emission current (emission electron current) Ie. At this time, as a rate (=Ie/Ips) of the emission current Ie relevant to the diode current Ips increases, the electron emission efficiency is high.

In the electron source 10', even if the direct current voltage Vps applied between the surface electrode 7 and the ohmic electrode 2 is defined as a low voltage of about 10V to 20V, electrons can be emitted. In addition, in the electron source 10', the dependency in degree of vacuum in electron emission characteristics can be reduced, and electrons can be emitted constantly with high emission efficiency without generating a hopping phenomenon during electron emission.

In a process for manufacturing the electron source 10', the step of forming the drift layer 6' includes the film forming step, anodic oxidation processing step, and oxidizing step. In the film forming step, a non-doped polycrystalline silicon layer is deposited on one surface of the n-type silicon substrate 1 that is an electrically conductive substrate. In the anodic oxidation processing step, the polycrystalline silicon layer is anodically oxidized, whereby a porous polycrystalline silicon layer containing polycrystalline silicon grains and silicon nanocrystals is formed. In the oxidizing step, the porous polycrystalline silicon layer is oxidized in accordance with a rapid thermal oxidization technique, and thin oxide films are formed respectively on the surfaces of the grain and silicon nanocrystals. In the anodic oxidation processing step, a mixture liquid obtained by mixing hydrogen fluoride water solution and ethanol at 1:1 is employed as an electrolyte employed for anodic oxidation. In the oxidizing step, a lamp annealing device is employed. After a substrate temperature has been increased for a short time from room temperature to 900° C. in dry oxygen, the substrate is maintained at 900° C. for one hour, and the substrate is oxidized. Then, the substrate temperature is lowered to room temperature.

As shown in FIG. 27, the thus formed drift layer 6' is considered as being composed of: at least a columnar polycrystalline silicon grain 51; a thin silicon oxide film 52 formed on a surface of the grain 51; a silicon nanocrystal 63 with its nanometer order interposed across the grains 51; and a silicon oxide film 64 formed on a surface of the silicon nanocrystal 63 and having its smaller film thickness than the crystalline particle size of the silicon nanocrystal 63. That is, in the drift layer 6', the surface of each grain 51 contained in the polycrystalline layer before carrying out anodic oxidation processing is made porous, and a crystalline state is maintained at the center portion of each grain 51.

Therefore, a majority of the electric field applied to the drift layer 6' is intensively applied to the silicon oxide film 64. As a result, the injected electrons are accelerated by a strong electric field relevant to the silicon oxide film 64, and drift among the grains 51 in an orientation indicated by the arrow A toward the surface. Thus, electron emission efficiency can be improved. Here, the electron source 10' utilizes a ballistic conducting phenomenon that occurs by setting the size (crystalline particle size) of the silicon nanocrystal 63 and the film thickness of the silicon oxide film 64 equal to or smaller than the film thickness (a degree of electron mean free path) when an electron tunneling phenomenon occurs. Electrons arrived at the surface of the drift layer 6' are considered as hot electrons. These electrons easily tunnels the surface electrode 7, and are emitted into a vacuum. In the electron source 10' comprising the drift layer 6', a heat generated in the drift layer 6' during electron emission is radiated through the grain 51. Thus, the heat generated in the drift layer 6' can be efficiently radiated, and an occurrence of a hopping phenomenon can be restricted.

As shown in FIG. 28, there is proposed an electron source 10 having an electrically conductive layer 12 formed on one surface of an insulating substrate 11 consisting of a glass substrate without employing an n-type silicon substrate as an electrically conductive substrate. In FIG. 28, like a constituent element similar to the electron source 10' shown in FIG. 26 is designated by a line reference numeral. A description thereof is omitted here. The drift layer 6' of the electron source 10' shown in FIG. 28 is formed in accordance with a process similar to a case of the electron source 10' shown in FIG. 26.

Procedures for emitting electrons from the electron source 10' shown in FIG. 28 are basically similar to those in the case of the electron source 10' shown in FIG. 26. However, the procedures are different from each other in that the direct current voltage Vps is applied between the surface electrode 7 and the electrically conductive layer 12 so that the surface electrode 7 becomes high in potential (positive polarity) relevant to the electrically conductive layer 12. In this manner, even in the electron source 10' shown in FIG. 28, electrons can be emitted in the same way as the electron source 10' shown in FIG. 26.

In recent years, as a device comprising a porous semiconductor layer that contains a semiconductor nanocrystal with a number of nano-orders formed by oxidizing the semiconductor layer at an anode, there is proposed a memory element (memory device) utilizing a new principle of operation which occurs in a nano-region (for example, Japanese Patent Laid-Open Publication No. 2001-222892). This memory element includes a storage layer for storing information by closing a carrier in a semiconductor nanocrystal with its nano-order capable of dosing a carrier, the carrier being covered with an insulating film.

However, in the above described conventional electron sources 10', although electrons can be emitted constantly with high electron emission efficiency, the dielectric strength is comparatively low, and the service life is comparatively short. Therefore, improvement of the dielectric strength and longer service life are expected.

In the step of forming the drift layer 6' of the above described conventional electron source 10', the oxidizing step is carried out after the anodic oxidation processing step. If a water component or a fluorine component remains in the porous polycrystalline silicon layer formed in the anodic oxidation processing step, these residual components affect silicon oxide films 52 and 64. Thus, there is a danger that the electron source 10' fails due to insulation destruction or the service life is reduced. That is, the silicon oxide films 52 and 64 are thermal oxide film formed in accordance with a rapid heating technique. Thus, if the water component or fluorine component remains, the residual components such as water component or fluorine component react with each other or are mixed when the silicon oxide films 52 and 64 are formed. In this manner, the film thickness of the silicon oxide films 52 and 64 becomes non-uniform or the film quality is degraded. As a result, there is a problem that a dielectric strength failure occurs, and the yield is lowered.

In addition, in a process for manufacturing the above described electron source 10', anodic oxidation processing is a wet process, and thus, the thickness of a porous region or the size of silicon nanocrystal and its distribution becomes non-uniform in plane. As a result, the size or distribution of the silicon nanocrystal 63 in the drift layer 6' becomes non-uniform. Thus, an in-plane distribution occurs with electron emission characteristics (such as current density of emission current or electron emission efficiency), and a defect locally occurs. There is a problem that an insulation destruction occurs, and the service life is reduced. In addition, there is another problem that it is difficult to obtain uniformity of the in-plane distribution, and thus, it is difficult to produce a large area.

In the meantime, in the step of forming the drift layer 6' of the above described electron sources 10', the porous polycrystalline silicon layer after the anodic oxidation processing step is active. Thus, if a film is exposed to the air between the anodic oxidation processing step and the oxidizing step (for example, a stay period of unfinished items), a natural oxide film is formed on the surface of the silicon nanocrystal and polycrystalline silicon each configuring a porous polycrystalline silicon layer. As a result, there is a danger that such natural oxide film affects the dielectric strength of the silicon oxide films 52 and 64, the electron source 10' fails due to insulation destruction, or the service life is reduced. That is, the silicon oxide films 52 and 64 are thin oxide films with their nanometer order, and thus, a rate of film thickness of a natural oxide film occupied in the entire film thickness of the silicon oxide films 52 and 64 increases. Thus, the silicon oxide films 52 and 64 with their high defect density are formed due to the presence of the natural oxide film, and it has become difficult to control the film thickness of the silicon oxide films 52 and 64. As a result, there occurs a problem that a dielectric strength voltage failure or the like occurs, and the yield is lowered.

As shown in FIG. 29, in the electron source 10' having the drift layer 6' formed by utilizing anodic oxidation processing, the size (crystalline particle size) of the silicon nanocrystal 63 that is a semiconductor nanocrystal in the drift layer 6' deviates. Thus, the silicon nanocrystals 63 covered with the silicon oxide film 64 whose surface is an insulating film deviate from each other, and are formed discontinuously. Then, a distribution of the silicon nanocrystals 63 becomes non-uniform. As a result, there is a problem that the scattering probability of electrons increases, and the electron emission efficiency is lowered. Further, there is a problem that degradation with an elapse of time occurs due to an increase in electron scattering, and the service life of the electron source 10' is reduced.

In a memory element having a storage layer formed by utilizing anodic oxidation processing, when the sizes of semiconductor nanocrystals deviate from each other, and are formed discontinuously, and a distribution of the semiconductor nanocrystals becomes non-uniform, there occurs a problem that it is difficult to control a write location of information in the storage layer, and the storage capacity is reduced.

As has been described previously, in the drift layer 6' in the above described conventional electron source 10', the porous polycrystalline silicon layer is oxidized, whereby a thin silicon oxide film is formed on a surface of a respective one of a number of silicon nanocrystals and a number of grains contained in the porous polycrystalline silicon layer. Then, for the purpose of forming a silicon oxide film with its good film quantity on all the silicon nanocrystals and grains, when the drift layer 6' is formed, the porous polycrystalline silicon layer is electrochemically oxidized in an electrolytic solution consisting of a water solution such as 1 mol/l of sulfuric acid or nitric acid. The electrolytic solution contains 90% or more (90 wt %) of water at a mass rate. The porous polycrystalline silicon layer is electrochemically oxidized, whereby the process temperature can be reduced compared with a case of rapidly heating the porous polycrystalline silicon layer, thereby forming the drift layer 6', and thus, a restriction on a substrate material is reduced. Therefore, a large area for the electron source 10' and cost reduction can be achieved.

However, in the electron source in which the porous polycrystalline silicon layer is electrochemically oxidized in the electrolytic solution consisting of a water solution such as sulfuric acid or nitric acid, thereby forming the drift layer, there is a problem that the emission current Ie or electron emission efficiency is small (insufficient) on an aspect of industrial utilization. In addition, there is a problem that the diode current Ips gradually increases, and the emission current Ie gradually decreases. Such problems is considered to occur the fact, when the drift layer 6' is formed, the oxidization of the porous polycrystalline silicon layer is carried out in the electrolytic solution consisting of a water solution such as sulfuric acid or nitric acid. That is, 90 wt % or more of water is contained in the electrolytic solution. Thus, a large amount of bonding associated with water molecules such as Si—H, Si—$H_2$, or Si—OH exists in the silicon oxide film formed in the drift layer 6'. Therefore, it is considered that the fineness of the silicon oxide film is impaired, the scattering of electrons easily occurs, and the dielectric strength is lowered.

SUMMARY OF THE INVENTION

The present invention has been made in order to solve the foregoing problem. It is an object of the present invention to provide a method of, and apparatus for, manufacturing an electron source in which a dielectric strength is easily improved, a service life is easily extended, and a large area is easily achieved.

It is another object of the present invention to provide a method of, and apparatus for, manufacturing an electron source capable of controlling the size or distribution of a semiconductor nanocrystal.

It is a further object of the present invention to provide a method of, and apparatus for, manufacturing an electron source with its high electron emission characteristics and high safety with an elapse of time.

An electron source (field emission type electron source) manufactured in accordance with a method according to the present invention includes: an electrically conductive substrate, a drift layer (strong field drift layer) formed on one surface of the electrically conductive substrate; and an electrically conductive thin film formed on the drift layer. In this electron source, a voltage is applied so that the electrically conductive thin film becomes positive in polarity relevant to the electrically conductive substrate. In this manner, electrons injected from the electrically conductive substrate into the drift layer drift the inside of the drift layer, and are emitted through the electrically conductive thin film. The method of manufacturing this electron source includes: an anodic oxidation processing step of, when a drift layer is formed, forming a porous semiconductor layer that contains a semiconductor nanocrystal in accordance with anodic oxidation; and an insulating film forming step of forming an insulating film on the surface of each semiconductor nanocrystal. In the anodic oxidation processing step, anodic oxidation processing is carried out while emitting light that essentially contains a wavelength of a visible light region relevant to the semiconductor layer. According to the method of manufacturing this electron source, the size or distribution of the semiconductor nanocrystal contained in the porous semiconductor layer can be controlled. In this manner, porous semiconductor layer in which a number of semiconductor nanocrystals are continuously distributed can be formed.

In the method of manufacturing this electron source, it is preferable that the wavelength of light emitted to the semiconductor layer be restricted by an optical filter. In this case, the wavelength of light emitted to the semiconductor layer can be easily adjusted.

Here, it is preferable that the optical filter be composed of at least one of an infrared cutting filter and a ultra-violet cutting filter. By doing so, a temperature rise caused by infrared rays that do not contribute to a porous film can be restricted. In addition, an amount of hole generation increases due to the ultra-violet rays, and the occurrence of a deviation in size or distribution of semiconductor nanocrystals can be restricted. Thus, the size or distribution of semiconductor nanocrystals contained in the porous semiconductor layer can be easily controlled.

In the method of manufacturing the electron source according to the present invention, it is preferable to set the wavelength of light to be emitted in the semiconductor layer at a wavelength at which the semiconductor nanocrystals are continuously connected to each other. In this case, a porous semiconductor layer in which a number of semiconductor nanocrystals with nanometer order are continuously connected to each other can be formed without employing an optical part such as an optical filter.

In the method of manufacturing the electron source according to the present invention, it is preferable to employ a light source of a monochromatic light. In this case, a porous semiconductor layer in which semiconductor nanocrystals of the same size are continuously connected to each other can be safely formed.

In the method of manufacturing the electron source according to the present invention, it is preferable to change the wavelength of light to be emitted in the semiconductor layer based on an elapse of time after anodic oxidation has started. In this case, the sizes of semiconductor nanocrystals can be controlled relevant to the thickness direction of the porous semiconductor layer. Namely, the sizes of the semiconductor nanocrystals can be differentiated relevant to the thickness direction of the porous semiconductor layer.

In the method of manufacturing the electron source according to the present invention, it is preferable to change the transmission wavelength of the optical filter based on an elapse of time after anodic oxidation has started. In this case, the sizes of the semiconductor nanocrystals can be controlled relevant to the thickness direction of the porous semiconductor layer.

Namely, the sizes of the semiconductor nanocrystals can be differentiated relevant to the thickness direction of the porous semiconductor layer.

In the method of manufacturing the electron source according to the present invention, it is preferable to intermittently emit light in the semiconductor layer. In this case, a temperature rise of the semiconductor layer can be restricted. In this manner, the size or distribution of the semiconductor nanocrystals in the porous semiconductor layer can be easily controlled.

In the method of manufacturing the electron source according to the present invention, it is preferable to emit light to the semiconductor layer from an opposite side to the surface of the semiconductor layer. In this case, a hole can be efficiently supplied from the opposite side to the surface as well as the surface side of the semiconductor layer. Here, the wavelength of both lights emitted from both sides in the thickness direction of the semiconductor layer may be changed synchronously. By doing this, holes can be supplied at both sides in the thickness direction of the semiconductor layer. Thus, even in the case where the thickness of the semiconductor layer is comparatively thick, this processing can be easily carried out. When the semiconductor layer is more porous, a band gap increases. Thus, larger energy is required to ensure that the layer is more porous. In general, when the wavelength is reduced, the light invasion depth becomes shallow. However, the semiconductor layer can be easily made more porous by thus emitting light from both sides in the thickness direction of the semiconductor layer. In addition, the sizes of the semiconductor nanocrystals formed in the porous semiconductor layer can be uniformed in the thickness direction of the porous semiconductor layer.

In the method of manufacturing the electron source according to the present invention, it is preferable to employ control means for controlling the concentration of an electrolyte in an anodic oxidation processing vessel so that forming of the porous semiconductor layer advances at the same velocity. In this case, in forming the porous semiconductor layer, the concentration of the electrolyte is controlled so that the velocities of producing a more porous semiconductor layer are identical to each other in a plane of a conductor layer. Thus, a process for anodic oxidation is stabilized, and the uniformity and reproducibility of the size or distribution of semiconductor nanocrystals contained in the porous semiconductor layer can be improved. As a result, the uniformity and reproducibility of size and distribution of the semiconductor nanocrystals in the drift layer can be improved. Therefore, the dielectric strength can be improved, and the service life can be extended. In addition, there can be provided an electron source with its high uniformity in a plane with electron emission characteristics and with a large area.

Here, it is preferable to utilize a control vessel for introducing an electrolyte with its adjusted temperature and concentration into an anodic oxidation processing vessel. In this case, the controllability of velocity for producing a more porous layer is improved. In this manner, the uniformity and reproducibility in a plane of the porous semiconductor layer can be improved. In addition, it is preferable that control means be provided to finely move a target comprising a lower electrode and a semiconductor layer. In this case, the uniformity and reproducibility of size and distribution of semiconductor nanocrystals contained in the porous semiconductor layer can be improved more remarkably.

In the method of manufacturing the electron source according to the present invention, it is preferable that the rinse step of removing the electrolyte remaining in the porous semiconductor layer by employing at least a hydrophilic organic solvent be included between the anodic oxidation processing step and insulating film forming step. In this case, the electrolyte or the like remaining in the porous semiconductor layer formed in accordance with the anodic oxidation processing step can be removed before the insulating film forming step. Thus, the quality of an insulating film formed on the surface of the semiconductor nanocrystals in the insulating film forming step can be improved. Therefore, the dielectric strength of the electron source can be improved, and the service life can be extended.

In the method of manufacturing the electron source according to the present invention, it is preferable that the rinse step of removing the electrolyte remaining in the porous semiconductor layer by employing at least a non-soluble organic solvent be included between the anodic oxidation processing step and the insulating film forming step. In this case, the electrolyte or the like remaining in the porous semiconductor layer formed in accordance with the anodic oxidation processing step can be removed before the insulating film forming step. Thus, the quality of an insulating fair formed on the surface of the semiconductor nanocrystal in accordance with the insulating film forming step can be improved. Therefore, the dielectric strength of the electron source can be improved, and the service life can be extended.

In the method of manufacturing the electron source according to the present invention, during a period specified between the anodic oxidation processing step and the oxidization processing step, it is preferable to prevent a natural oxide film from being formed on the surface of the semiconductor nanocrystal without exposing the porous semiconductor layer to the air. In this case, during the above specified period, the natural oxide film can be prevented from being formed on the surface of the semiconductor nanocrystal. Thus, the quality of the oxide film formed on the surface of the semiconductor nanocrystal in accordance with the oxidization processing step can be improve. Therefore, the dielectric strength of the electron source can be improved, and the service life can be extended.

During the above specified period, it is preferable to cover the surface of the porous semiconductor layer with a non-oxide liquid. By doing this, in the case where such a non-oxide liquid is employed for rinsing in accordance with the anodic oxidation processing step, for example, the natural oxide film can be prevented from being formed by utilizing such a non-oxide liquid. In addition, in the above specified period, atmosphere may be used as an inert gas. By doing this, contamination of the porous semiconductor layer can be restricted. In the above specified period, at least the porous semiconductor layer may be held in a vacuum. By doing this, the adhering of impurities to the porous semiconductor layer can be restricted.

In the method of manufacturing the electron source according to the present invention, it is preferable that the insulation film forming step includes the main oxidation processing step of electrochemically oxidizing the porous semiconductor layer in an electrolyte having a solute dissolved in an organic solvent. In this case, an emission current or electron emission efficiency and the like increases as compared with the prior art, and the stability of electron emission characteristics of the electron source with an elapse of time can be improved. One of the reasons what the emission current and electron emission efficiency are thus improved, and the stability of electron emission characteristics with an elapse of time is improved is stated as follows. That is, this is because the density of the oxide film increases, and the dielectric strength of the oxide film is improved as compared with a conventional technique for electrochemically oxidizing the porous, polycrystalline silicon layer in an electrolytic solution consisting of a water solution such as sulfuric acid or nitric acid, thereby forming a drift layer. In addition, as compared with a case in which the porous semiconductor layer is thermally oxidized rapidly, thereby forming a drift layer, a process temperature can be reduced, an area for an electron source can be increased, and cost reduction can be achieved.

In the method of manufacturing the electron source that contains the main oxidization processing step, it is preferable to add water to an electrolytic solution. By doing this, in the case where there is employed a substance having its small solubility to an organic solvent serving as a solute and having its large solubility to water, the concentration of the solute in the electrolytic solution can be increased by adding water. Thus, the film quality of the oxide film is improved. In addition, as the concentration of the solute increases, the conductivity of the electrolytic solution increases. Therefore, a deviation in plane of the film thickness of the oxide film can be restricted.

In the method of manufacturing the electron source including the main oxidization processing step, it is preferable that the auxiliary oxidization processing step of oxidizing the porous semiconductor layer in accordance with a thermal oxidization technique be included at least before or after the main oxidization processing step. By doing this, the density of the oxide film can be improved more remarkably.

In the method of manufacturing the electron source that contains the main oxidization processing step, the pre-oxidization processing step of oxidizing the porous semiconductor layer before the main oxidization processing step may be included. In this case, the density of the oxide film can be improved more remarkably. Further, in the thickness direction of the drift layer, the film thickness of the oxide film existing in a region that is comparatively close to the electrically conductive thin film can be restricted from being larger than that of the oxide film that exists in a region that is comparatively distant from the electrically conductive thin film. In this manner, electron emission efficiency and stability with an elapse of time can be improved. In addition, the pre-oxidization processing step of oxidizing the porous semiconductor layer before the main oxidization processing step and auxiliary oxidization processing step may be included. In this case as well, in the thickness direction of the drift layer, the film thickness of the oxide film existing in a region that is comparatively close to the electrically conductive thin film can be restricted from being larger than that of the oxide film existing in a region that is comparatively distant from the electrically conductive thin film, and in this manner, electron emission efficiency and stability with an elapse of time can be improved.

In the method of manufacturing the electron source that contains the main oxidization processing step, the rinse step of rinsing the porous semiconductor layer may be included after the main oxidization processing step. In this case, even if impurities such as alkali metal or heavy metal enter the porous semiconductor layer, such impurities can be removed in the rinse step. As a result, the electron emission characteristics of the electron source can be stabilized and long-term reliability can be improved.

In addition, an apparatus for manufacturing the above electron source according to the present invention includes: an anodic oxidation processing device for, when a drift layer is formed, forming a porous semiconductor layer that contains a semiconductor nanocrystal in accordance with anodic oxidation; and an insulating film forming device for forming an insulating film on the surface of each semiconductor nanocrystal. Here, the anodic oxidation processing device is designed to carry out anodic oxidation processing while emitting light that essentially contains the wavelength in a visible light region relevant to the semiconductor layer. According to this electron source manufacturing apparatus, the size or distribution of semiconductor nanocrystals contained in the porous semiconductor layer can be controlled. In this manner, there can be formed a porous semiconductor layer in which a number of semiconductor nanocrystals are distributed to be continuously connected to each other.

BRIEF DESCRIPTION OF THE DRAWINGS

The present invention will be fully understood by the detailed description of the invention and accompanying drawings. Like elements common in drawings are designated by like reference numerals.

DETAILED DESCRIPTION OF THE PREFERRED EMBODIMENTS

First Embodiment

In a first embodiment, an electron source is manufactured by utilizing anodic oxidation processing. In the electron source according to the first embodiment, a single-crystalline n-type silicon substrate whose resistivity is comparatively close to that of a conductor (for example, a (100) substrate with its resistivity of about 0.01 Ω/cm to 0.02 Ω/cm) is employed as an electrically conductive substrate.

Figure 3:
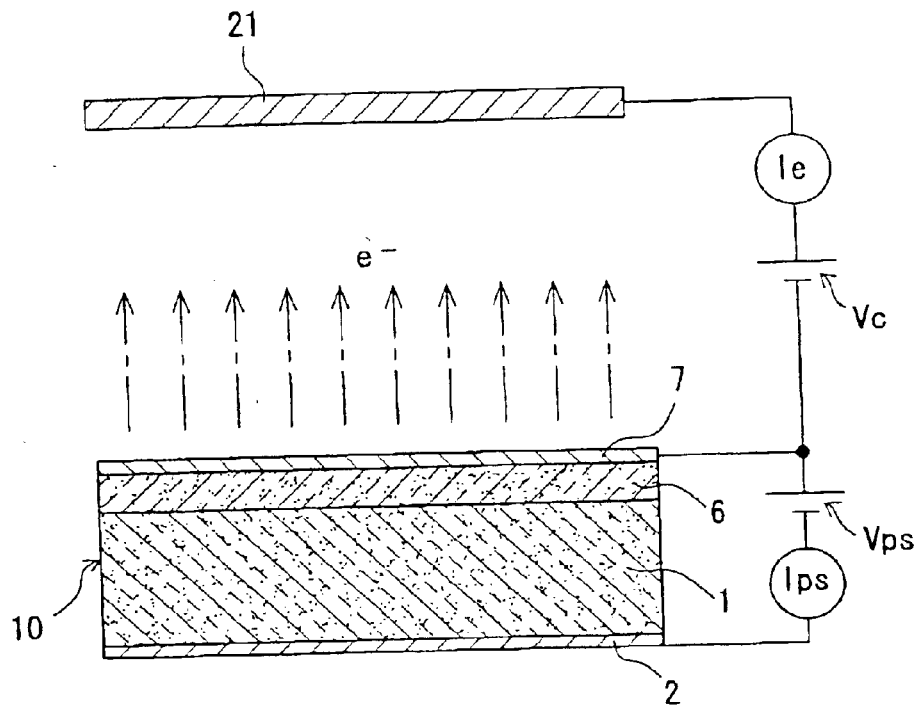
FIG. 3 is a view illustrating an operation of the electron source.

As shown in FIG. 3, in an electron source 10 according to the first embodiment, a drift layer 6 consisting of an oxidized porous polycrystalline silicon layer is formed on a main surface of an n-type silicon substrate 1 that is a conductive substrate. A surface electrode 7 is formed on the drift layer 6. An ohmic electrode 2 is formed on a back face of the n-type silicon substrate 1. In the first embodiment, a lower electrode is composed of the n-type silicon substrate 1 and the ohmic electrode 2. Therefore, the surface electrode 7 is opposite to the lower electrode, and the drift layer 6 is interposed between the lower electrode and the surface electrode 7. The porous polycrystalline silicon layer configures a porous semiconductor layer.

A material with its small work function is employed as a material of the surface electrode 7. The thickness of the surface electrode 7 is set to 10 nm. However, this thickness may be such a thickness that electrons passing through the drift layer 6 can be tunneled without being limited to 10 nm. The thickness of the surface electrode 7 may be set to about 10 nm to 15 nm.

The surface electrode 7 is composed of: a first thin film layer consisting of a metal film (for example, Cr film) formed on the drift layer 6; and a second thin film layer consisting of a metal film (for example, Au film) deposited on the first thin film layer. As a material for the first thin film layer on the drift layer 6, for example, there is employed a material such as chrome, nickel, platinum, titanium, or indium, having high intimacy with the drift layer 6, the material being capable of preventing diffusion between the second thin film layer and the drift layer 6. As a material for the second thin film layer, there is employed a gold or the like with its low resistance and high stability with an elapse of time. In the embodiment, Cr is employed as a material for the first thin layer. The thickness of the first thin film layer is set to 2 nm. Au is employed as a material for the second thin film layer. The thickness of the second thin film layer is set to 8 nm. In the first embodiment, the surface electrode 7 is composed of a two-layered metal film However, the electrode may be composed of a one-layered or three or more layered metal film.

In the electron source 10 shown in FIG. 3, the surface electrode 7 is disposed in a vacuum, and a collector electrode 21 is disposed in opposite to the surface electrode 7.

Then, a direct current voltage Vps is applied so that the surface electrode 7 is positive in polarity relevant to the n-type silicon substrate 1 (ohmic electrode 2). Further, a direct current voltage Vc is applied so that the collector electrode 21 is positive in polarity relevant to the surface electrode 7. In this manner, electrons injected from the n-type silicon substrate 1 drift the drift layer 6, and are emitted through the surface electrode 7 (the single-dotted chain line shown in FIG. 3 indicates the flow of electron "e-" emitted through the surface electrode 7). As has been described previously, a current flowing between the surface electrode 7 and the n-type silicon substrate (ohmic electrode 2) is referred to as a diode current Ips, and a current flowing between the collector electrode 21 and the surface electrode 7 is referred to as an emission current (emission electron current) Ie. As a rate of the emission current Ie to the diode current Ips increases, the electron emission efficiency increases.

Figure 4:
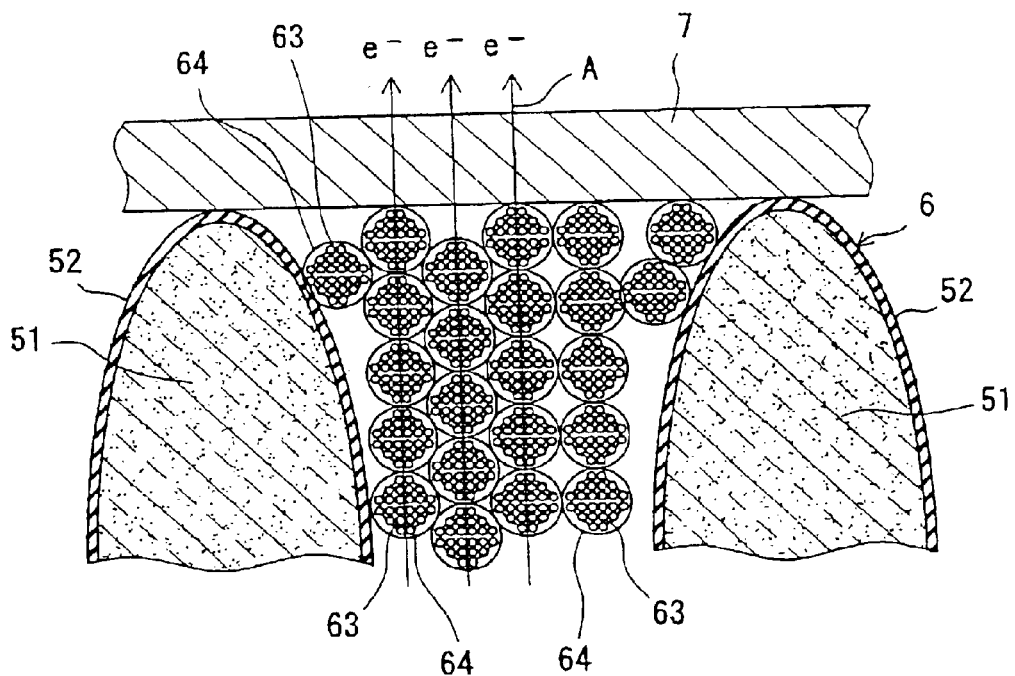
FIG. 4 is a view showing an electron emitting operation of the electron source.

As shown in FIG. 4, the drift layer 6 in the first embodiment is composed of: at least a columnar polycrystalline silicon grain 51; a thin silicon oxide film 52 formed on the surface of the grain 51; a number of silicon nanocrystals 63 with nanometer order interposed between the grains 51; and a number of silicon oxide film 64 that is an insulating film formed on the surface of each silicon nanocrystal 63, the film having its smaller film thickness than the crystalline particle size of the silicon nanocrystal 63. In short, in the drift layer 6, the surface of each grain 51 is made porous, and the crystalline state is maintained at the center portion of each grain 51. The thickness of the silicon oxide film 64 formed on the surface of the silicon nanocrystal 63 is set to the degree of the electron mean free path (the mean free path of electrons in $SiO_2$ is known to be about 3 nm), and is desirable to be about 1 nm to 3 nm. The crystalline particle size of the silicon nanocrystal 63 is smaller than the degree of electron mean free path.

In the electron source 10 according to the first embodiment, electron emission occurs in the following model. That is, the direct current voltage Vps is applied so that the surface electrode 7 is positive in polarity between the surface electrode 7 and n-type silicon substrate 1 (ohmic electrode 2) which are disclosed in a vacuum. In addition, the direct current voltage Vc is applied so that the collector electrode 21 is positive in polarity between the collector electrode 21 and the surface electrode 7. When the direct current voltage Vps reaches a predetermined value (critical value), the electron "e" is injected by thermal excitation into the drift layer 6 from the n-type silicon substrate 1 serving as the lower electrode. On the other hand, a majority of the electric field applied to the drift layer 6 is applied to the silicon oxide film 64. Thus, the injected electron "e" is accelerated by a strong electric field applied to the silicon oxide film 64. Then, the electron drift the inside of a region between the grains 51 in the drift layer 6 drift toward the surface in an orientation indicated by the arrow A in FIG. 4, and is emitted in a vacuum after tunneled through the surface electrode 7. Thus, in the drift layer 6, the electron injected from the n-type silicon substrate 1 is accelerated and drifts the inside of the strong electric field applied to the silicon oxide film 64 without being hardly scattered by the silicon nanocrystal 63. Then, the electron is emitted through the surface electrode 7 (a ballistic electron emission phenomenon). In addition, the heat generated in the drift layer 6 is radiated through the grain 51. Thus, a hopping phenomenon does not occur during electron emission, and electrons can be emitted constantly. The electron reaching the surface of the drift layer 6 is considered as a hot electron, but is easily tunneled through the surface electrode 7, and is emitted in a vacuum.

Hereinafter, a method of manufacturing an electron source 10 according to the first embodiment will be described with reference to FIG. 2A to FIG. 2D.

Figure 2A:
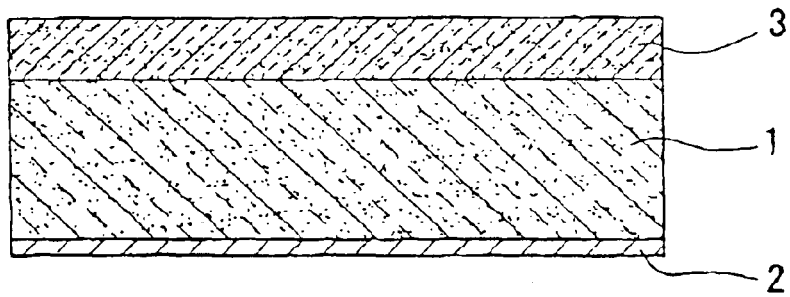
FIG. 2A to FIG. 2D are sectional views each showing an electron source or its material in the main step of a process for manufacturing the electron source.

First, an ohmic electrode 2 is formed on the back face of an n-type silicon substrate 1. A non-doped polycrystalline silicon layer 3 is formed as a semiconductor layer on the main surface of the n-type silicon substrate 1. In this manner, a structure shown in FIG. 2A is obtained. As a method of film forming the polycrystalline silicon layer 3, for example, there is employed a CVD technique (such as LPCVD technique, plasma CVD technique, or catalytic CVD technique, for example); a sputtering technique, or a CGS (Continuous Grain Silicon) technique and the like.

Figure 2B:
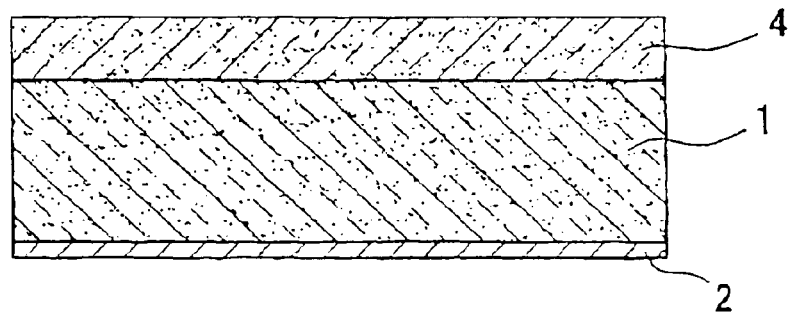

After the non-doped polycrystalline silicon layer 3 has been formed, a polycrystalline silicon layer 3 is formed in accordance with the anodic oxidation processing step. In this manner, a porous polycrystalline silicon layer 4 that is a porous semiconductor layer is formed, and a structure shown in FIG. 2B is obtained. In the first embodiment, although all of the polycrystalline silicon layer 3 is made porous, only a part of the layer may be made porous.

Figure 1:
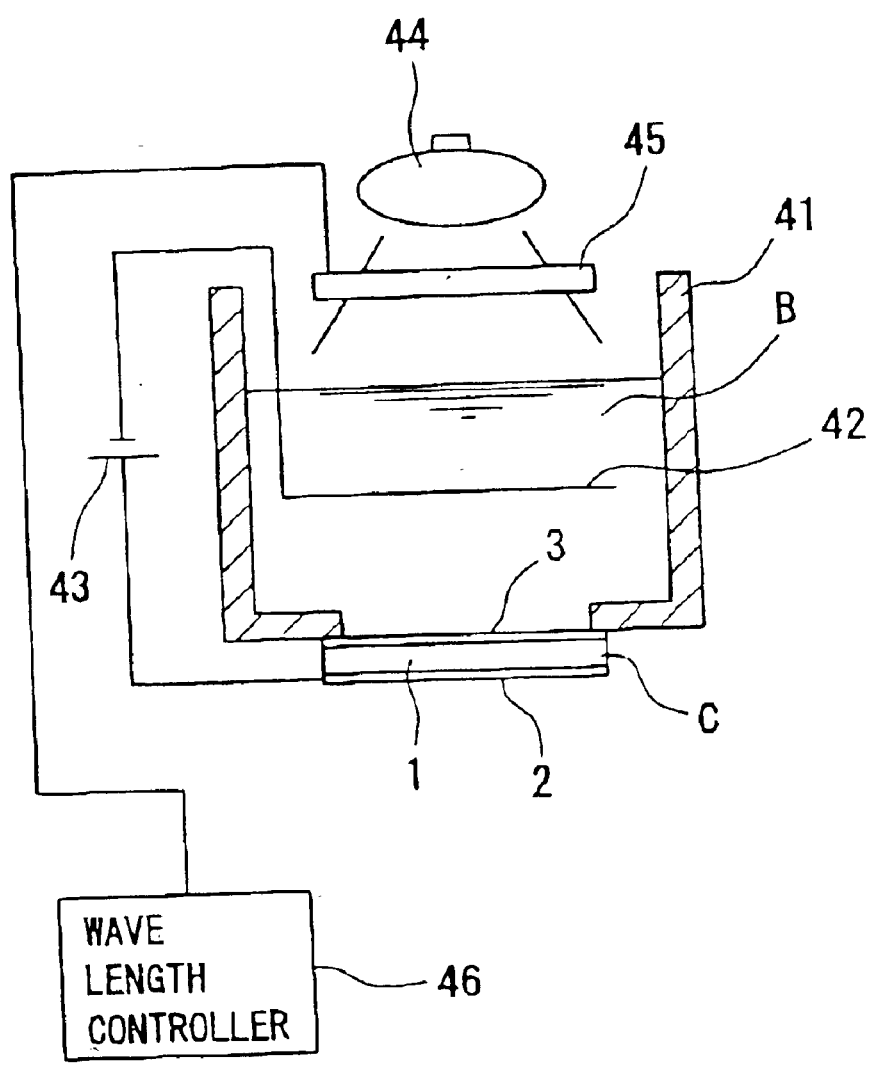
FIG. 1 is a schematic view depicting a general construction of an anode oxidizing device employed for manufacturing an electron source according to a first embodiment.

In the anodic oxidation processing step, an anode oxidizing device shown in FIG. 1 is employed. The anode oxidizing device shown in FIG. 1 includes: a processing vessel 41 having an electrolyte B that contains a hydrogen fluoride water solution; and a cathode (negative polarity) 42 consisting of platinum immersed in the electrolyte B. Then, a target C obtained when the polycrystalline silicon layer 3 being a semiconductor layer is formed on the lower electrode (in the first embodiment, the lower electrode is composed of the n-type silicon substrate 1 and the ohmic electrode 2.) is placed in a processing vessel 41 so that only a part of the surface of the polycrystalline silicon layer 3 comes into contact with the electrolyte B. This anode oxidizing device includes: a voltage source 43 that is electrify between an anode and a cathode with the lower electrode being an anode; a light source 44 for emitting light to the main surface side of the target C (on the surface side of the polycrystalline silicon layer 3); a filter device 45 disposed between the light source 44 and the target C, the filter device being capable of changing the light transmission wavelength; a wavelength controller device 46 capable of controlling the transmission wavelength of the filter device 45. When anodic oxidation is carried out while power is supplied between the anode and cathode with the lower electrode being an anode, the light of the light source 44 is emitted to the main surface side of the target C through the filter device 45.

In the first embodiment, a tungsten lamp is employed as the light source 44. Then, the side of a number of silicon crystals 63 is controlled by adjusting the wavelength of the light emitted to the target C through the filter device 45. In this manner, the silicon nanocrystals 63 of the same size are formed to be continuously connected to each other. As the filter device 45, there is employed: a waveform variable filter for changing the transmission wavelength by utilizing light interference; or a wavelength variable filter or the like for changing the transmission wavelength by utilizing a change in refractive index of a liquid crystal due to an electric field. However, it is desirable that the transmission wavelength can be continuously changed. As the electrolyte B, there is employed a mixture liquid obtained by mixing 55 wt % of hydrogen fluoride water solution and ethanol by substantially 1:1. The porous polycrystalline silicon layer 4 contains a number of polycrystalline silicon grains and a number of silicon nanocrystals. In the first embodiment, the filter device 45 and wavelength controller device 46 configure adjustment means for adjusting the wavelength of the light emitted from the light source 44 to the polycrystalline silicon layer 3 that is a semiconductor layer so that the adjacent silicon nanocrystals are formed to be continuously connected to each other.

Figure 2C:
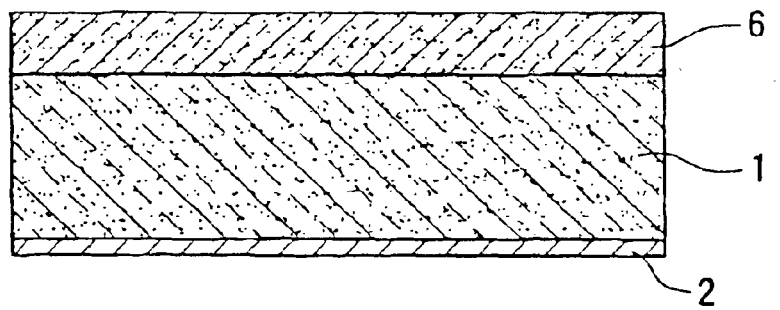

After the anodic oxidation processing step has terminated, the porous polycrystalline silicon layer 4 is oxidized in accordance with the oxidizing step. In this manner, the drift layer 6 consisting of the oxidized porous polycrystalline silicon layer is formed, and a structure shown in FIG. 2C is obtained. In the oxidizing step, the porous polycrystalline silicon layer 4 is oxidized in accordance with the rapid heating technique, and the drift layer 6 containing the grain 51, silicon nanocrystal 63 and silicon oxide films 52 and 64 is formed. In the oxidizing step using the rapid heating technique, a lamp annealing device is employed. Then, the $O_2$ gas atmosphere is produced in the inside of a furnace. The substrate temperature is risen from room temperature to a predetermined oxidization temperature (for example, 900° C.) by a predetermined temperature rise velocity (for example, 80° C./sec). In addition, the substrate temperature is maintained for a predetermined oxidization time (for example, one hour). After rapid thermal oxidation (RTO) has been thus carried out, the substrate temperature is lowered to room temperature. In the first embodiment, the temperature rise velocity is set to 80° C./sec. However, the temperature rise velocity may be set to 80° C./sec or more, and it is preferable that the velocity be set to 160° C./sec or more.

Figure 2D:
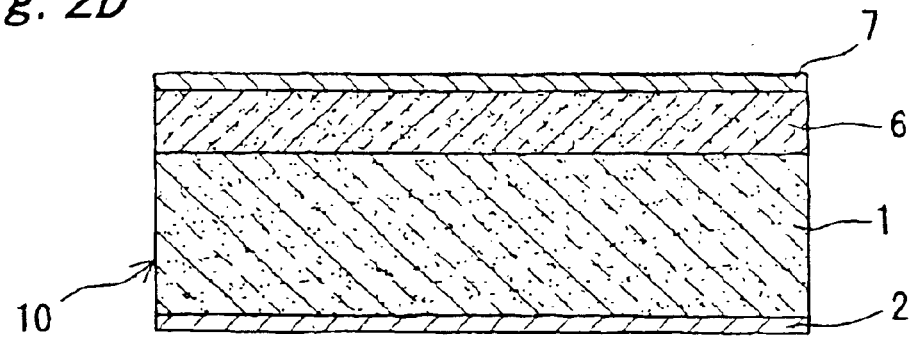

After the drift layer 6 has been formed, a first thin film layer consisting of a metal film (Cr film in the first embodiment) is deposited on the drift layer 6 in accordance with an electron beam vapor deposition technique. Further, the second thin film layer consisting of a metal film (Au film in the first embodiment) is deposited on the first thin film layer in accordance with the electron beam vapor deposition technique. In this manner, the surface electrode 7 consisting of the first thin film layer and the second thin film layer is formed, and the electron source 10 shown in FIG. 2D is obtained. In the first embodiment, the surface electrode 7 is formed in accordance with the electron beam vapor deposition technique. However, as a method of forming the surface electrode 7, for example, a sputtering technique may be employed without being limited to the electron beam vapor deposition technique.

In this manufacturing method, there is employed: adjustment means for adjusting the wavelength of the light emitted from the light source 44 to the polycrystalline silicon layer 3 that is a semiconductor layer so that the adjacent silicon nanocrystals are formed to be continuously connected to each other. Thus, the size or distribution of silicon nanocrystals contained in the porous polycrystalline silicon layer 4 that is a porous semiconductor layer can be controlled. In this manner the silicon nanocrystals contained in the porous polycrystalline silicon layer 4 are formed to be continuously connected to each other. In addition, the size or distribution of the silicon nanocrystals 63 contained in the drift layer 6 can be controlled.

As shown in FIG. 4, the sizes of a number of silicon nanocrystals 63 can be uniformed in the drift layer 6 of the electron source 10 manufactured in accordance with this manufacturing method. In addition, a number of silicon nanocrystals 63 each having a silicon oxide film 64 that is an insulating film are formed to be continuously connected to each other on a surface, respectively. As a result, in the electron source 10 according to the first embodiment, the electron scattering in the drift layer 6 can be reduced as compared with that of the prior art. Thus, the dielectric strength and electron emission efficiency is improved, and the service life is extended. Further, the in-plane uniformity of electron emission characteristics can be improved, and a large area can be obtained.

In the meantime, in this manufacturing method, the wavelength of the light emitted to the polycrystalline silicon layer 3 that is a semiconductor layer is properly controlled, thereby making it possible to uniform the size f the silicon nanocrystals 63 in the thickness direction of the drift layer 6, as shown in FIG. 4.

Figure 5:
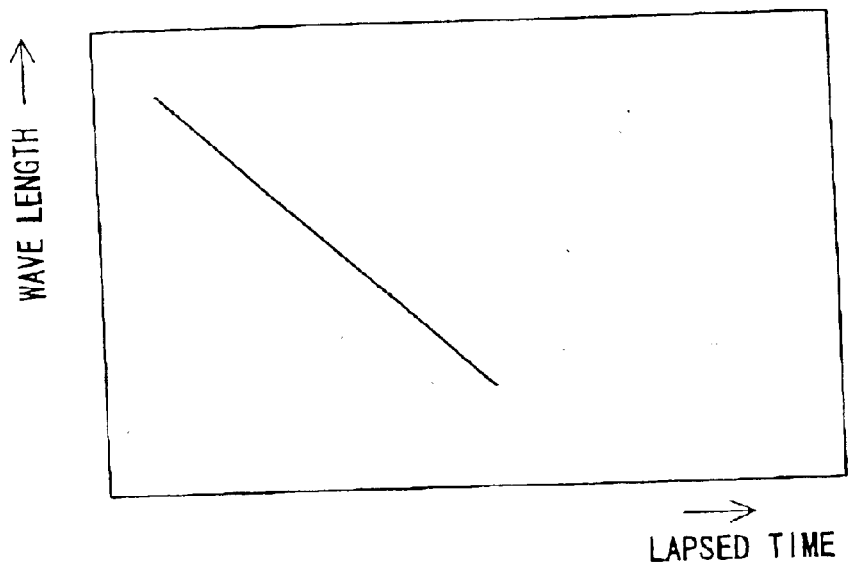
FIG. 5 is a graph depicting a relationship between a light wavelength and an elapse of time in the anodic oxidation processing step of a process for manufacturing the electron source.

However, as shown in FIG. 5, the wavelength of light may be changed from a long wavelength side to a short wavelength side based on an elapse of time after anodic oxidation has started.

Figure 6:
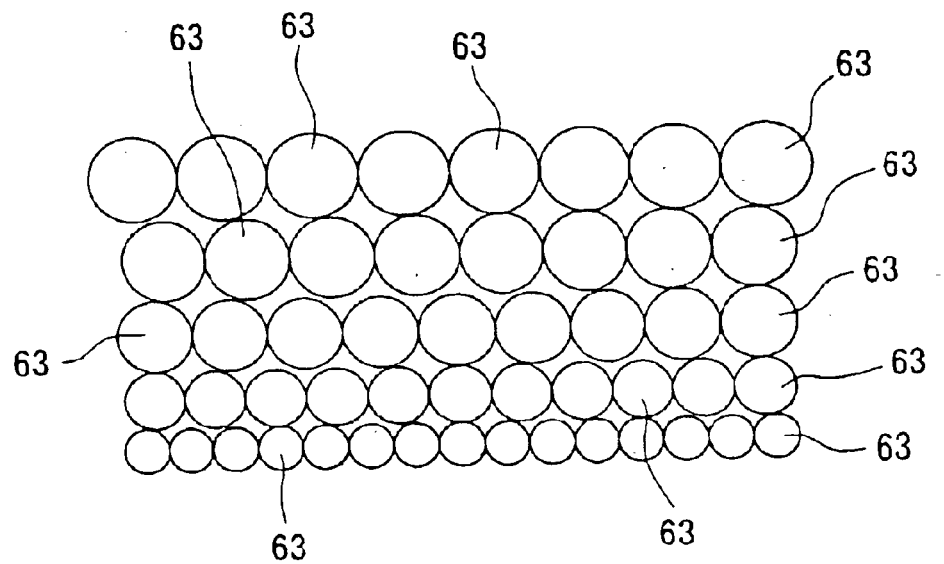
FIG. 6 is a view showing an example of a method of manufacturing the electron source.

In this case, as shown in FIG. 6, the size of the silicon nanocrystal 63 can be changed in the thickness direction (vertical direction of FIG. 6). (In FIG. 6, the size of the silicon nanocrystal 63 is reduced as the porous polycrystalline silicon layer 4 is deeper in the depth direction from the surface of the layer).

Figure 7:
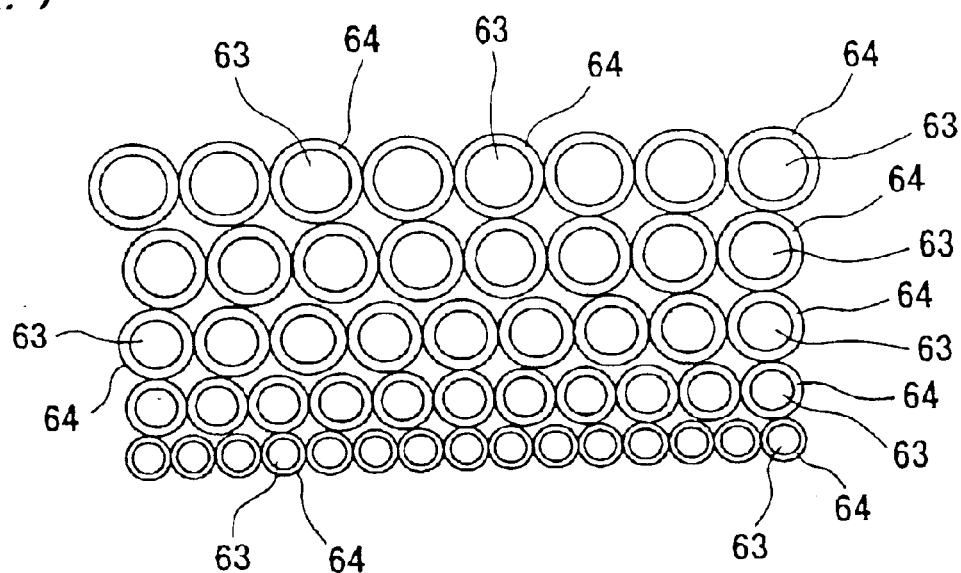
FIG. 7 is a view showing an example of a method of manufacturing the electron source.

As a result, as shown in FIG. 7, the size of the silicon nanocrystal 63 in the drift layer 6 can be changed in the thickness direction. In an example shown in FIG. 7, as the drift layer 6 is deeper from its surface, the size of the silicon nanocrystal 63 (crystalline particle size) is reduced. On the other hand, the band gap between the silicon nanocrystals 63 is reduced as the crystalline particle size increases. Thus, the electric field applied to the silicon oxide film 64 is relatively larger at the surface side of the drift layer 6. Therefore, the improvement of electron emission characteristics due to an effect of a strong electric field can be expected. In FIG. 7, an electron is emitted upwardly.

Figure 8:
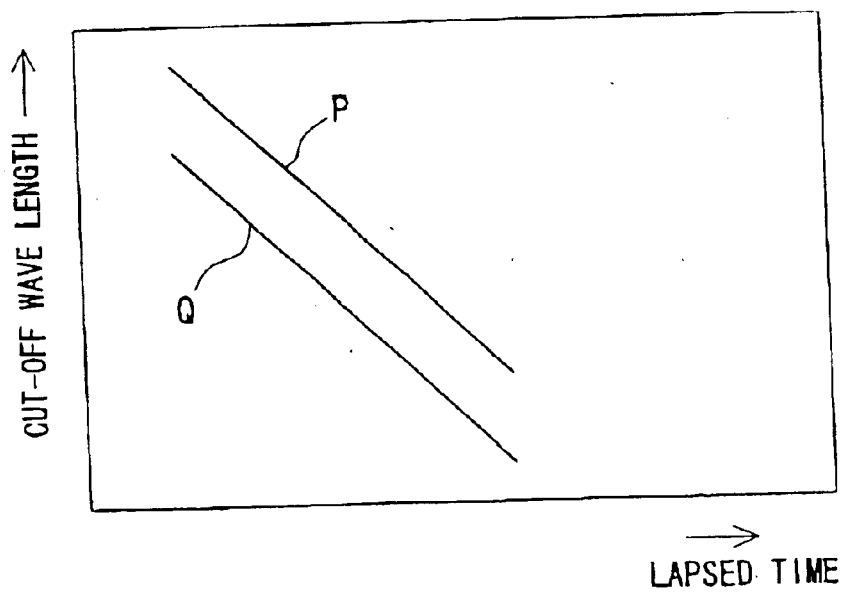
FIG. 8 is a graph depicting a relationship between a cutoff wavelength and an elapse of time in the anodic oxidation processing step of a process for manufacturing the electron source.

In addition, as indicated by P and Q in FIG. 8, the cutoff wavelength on the long wavelength side and the cutoff wavelength on the short wavelength side in the filter device 45 may be changed, respectively, based on an elapse of time after starting anodic oxidation. In this case as well, as shown in FIG. 6, the size of the silicon nanocrystal 63 can be changed in the thickness direction. As a result, the size of the silicon nanocrystal 63 in the drift layer 6 can be changed in the thickness direction as shown in FIG. 7.

Figure 9:
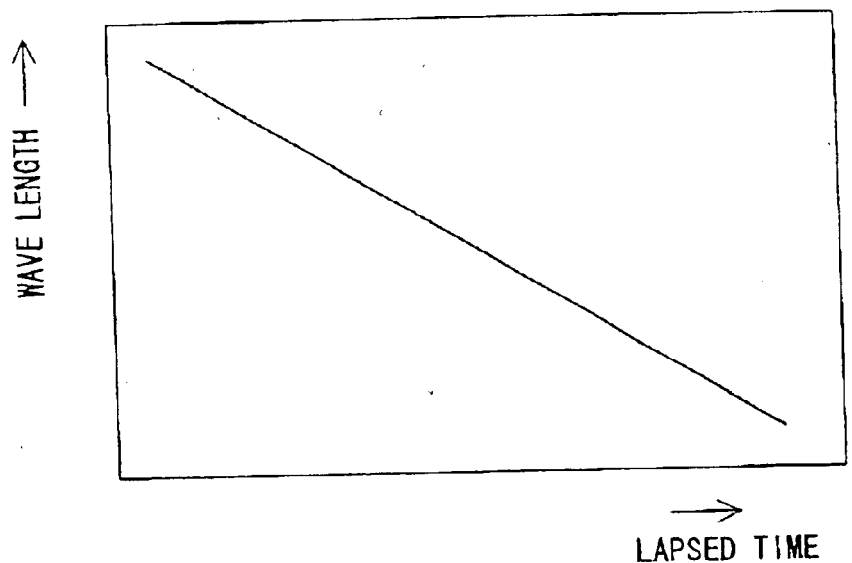
FIG. 9 is a graph depicting a relationship between a light wavelength and an elapse of time in the anodic oxidation processing step of a process for manufacturing the electron source.

In addition, as shown in FIG. 9, in adjusting the wavelength of light emitted to the polycrystalline silicon layer 3 that is a semiconductor layer, the wavelength of the light emitted to the polycrystalline silicon layer 3 may be changed based on a change in time after starting anodic oxidation so that the crystalline particle size of the silicon nanocrystal 63 continuously changes in the thickness direction of the polycrystalline silicon layer 3.

Figure 10:
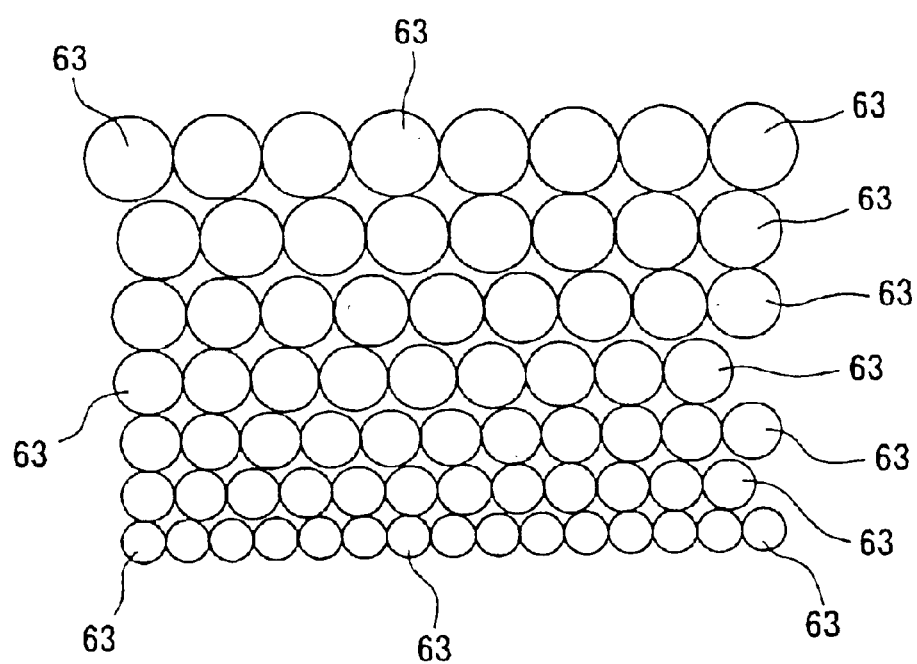
FIG. 10 is a view showing an example of a method of manufacturing the electron source.

By doing this, as shown in FIG. 10, the size of the silicon nanocrystal 63 can be controlled with good controllability in the thickness direction of the porous polycrystalline silicon layer 4.

The above described filter device 45 is employed so as to change the transmission wavelength. However, an optical filter composed of an infrared cutting filter and a ultraviolet cutting filter (a long-pass filter) may be employed. By employing such an optical filter, an increase in velocity of anodic oxidation due to a temperature rise caused by an infrared ray that does not contribute to making porous the polycrystalline silicon layer 3 can be restricted (only the light having energy larger than the silicon band gap contributes to generation of a pair of electron and hole, and thus, the light having smaller energy than band gap such as infrared ray does not contribute to generation of a pair of electron and hole). In addition, it is possible that an amount of hole generation from increases due to the ultraviolet rays, electrolytic polishing occurs, and a deviation in size or distribution of the silicon nanocrystal 63 occurs. Thus, the size or distribution of the silicon nanocrystal 63 contained in the porous polycrystalline silicon layer 4 is easily controlled. That is, in the case where a low energy component such as infrared ray is included in light emitted to the polycrystalline silicon layer 3, this component does not contribute to making porous the layer, and causes a temperature rise in the electrolyte B or target C. Thus, the etching velocity in the crystalline particle field of the polycrystalline silicon layer 3 increases, and the porous structure of the porous polycrystalline silicon layer 4 is made nonuniform. In addition, in the case where a high energy component such as ultraviolet ray is included, the etching velocity increases, making it difficult to control the porous structure of the porous polycrystalline silicon layer 4. To overcome this difficulty, the infrared ray and ultraviolet ray are cut so that only the light contributing to making porous the layer is emitted, whereby the porous structure of the porous polycrystalline silicon layer 4 can be obtained constantly. Besides, the filter device 45 may be constructed at either of the infrared ray cutting filter and ultraviolet cutting filter.

In the above-described example, a tungsten lamp is employed as the light source 44. However, a light source of a monochromatic light (for example, laser) is employed as the light source 44, whereby the porous polycrystalline silicon layer 4 in which the silicon nanocrystals 63 of the same size are continuously connected to each other can be formed constantly. Then, the wavelength of light is changed based on an elapse of time after anodic oxidation has started, whereby the size of the silicon nanocrystal 63 can be changed in the thickness direction of the porous polycrystalline silicon layer 4. In addition, the light is intermittently emitted from the light source 44 to the polycrystalline silicon layer 3, whereby a temperature rise of the target C or electrolyte B can be restricted. In this case, the size or distribution of the silicon nanocrystals 63 in the porous polycrystalline silicon layer 4 is easily controlled.

Second Embodiment

Hereinafter, a second embodiment of the present invention will be described now. In the second embodiment as well, an electron source is manufactured by utilizing anodic oxidation processing. However in the second embodiment, as an electrically conductive substrate, there is employed a substrate in which an electrically conductive layer consisting of an ITO film is provided on one surface of an insulating substrate consisting of a glass substrate (for example, a quartz glass substrate).

Figure 11:
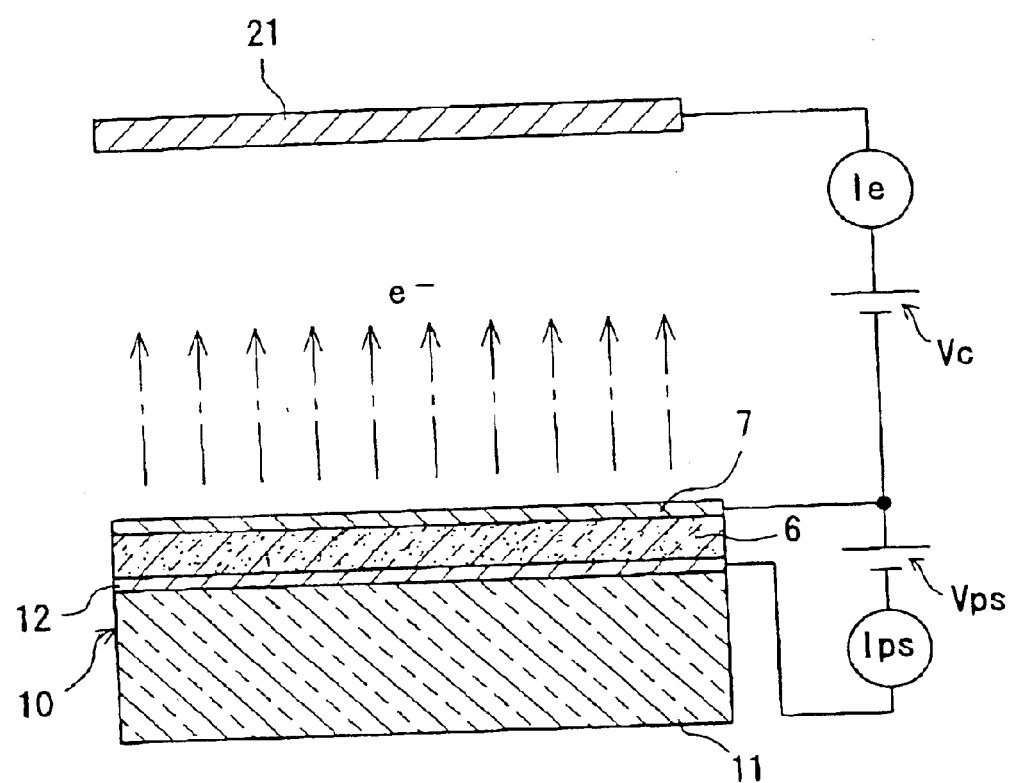
FIG. 11 is a view showing an operation of an electron source according to a second embodiment.

A shown in FIG. 11, in the electron source 10 according to the second embodiment, the drift layer 6 consisting of an oxide porous polycrystalline silicon layer is formed on an electrically conductive layer 12 on the insulating substrate 11. The surface electrode 7 is formed on the drift layer 6. In the second embodiment, the electrically conductive layer 12 configures a lower electrode. Therefore, in the second embodiment as well, the surface electrode 7 is opposite to the lower electrode, and the drift layer 6 is interposed between the lower electrode and the surface electrode 7. A construction of the surface electrode 7 is similar to that according to the first embodiment.

Procedures for emitting a electron from the electron source 10 according to the second embodiment are basically similar to those in the first embodiment. However, the direct current voltage Vps is applied between the surface electrode 7 and the electrically conductive layer 12 so that the surface electrode 7 becomes positive in polarity (high potential) relevant to the electrically conductive layer 12. In the electron source 10 according to the second embodiment as well, an electron can be emitted in the same manner as that in the first embodiment. In addition, a structure and electron emission mechanism of the drift layer 6 of the electron source 10 according to the second embodiment are similar to those according to the first embodiment (refer to FIG. 4).

In the case where the electron source 10 according to the second embodiment is utilized as an electron source of a display, the lower electrode or surface electrode 7 and the like may be patterned.

Hereinafter, a method of manufacturing the electron source 10 according to the second embodiment will be described with reference to FIG. 12A to FIG. 12D.

Figure 12A:
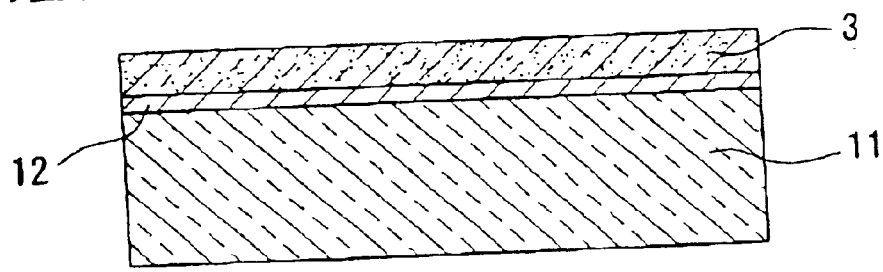
FIG. 12A to FIG. 12D are sectional views each showing an electron source and its material in the main step of a process for manufacturing the electron source shown in FIG. 11.

First, on one surface of the insulating substrate 11, the electrically conductive layer 12 consisting of the ITO film is formed in accordance with the sputtering technique, and an electrically conductive substrate is fabricated. Then, on the main surface side (on the electrically conductive layer 12) of the electrically conductive substrate, a non-doped polycrystalline silicon layer 3 is formed as a semiconductor layer, and a structure shown in FIG. 12A is obtained. As a method of film forming the polycrystalline silicon layer 3, for example, there can be employed a CVD technique, a sputtering technique, or a CGS technique or the like.

Figure 12B:
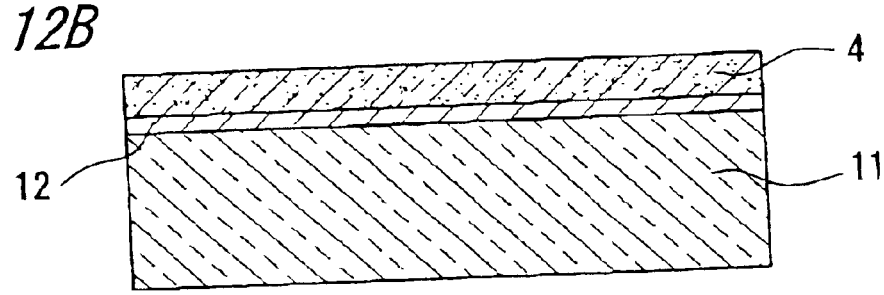

After the non-doped polycrystalline silicon layer 3 has been formed, the polycrystalline silicon layer 3 is made porous in accordance with the anodic oxidation processing step. In this manner, the porous polycrystalline silicon layer 4 that is a porous semiconductor layer is formed, and a structure shown in FIG. 12B is obtained.

Figure 13:
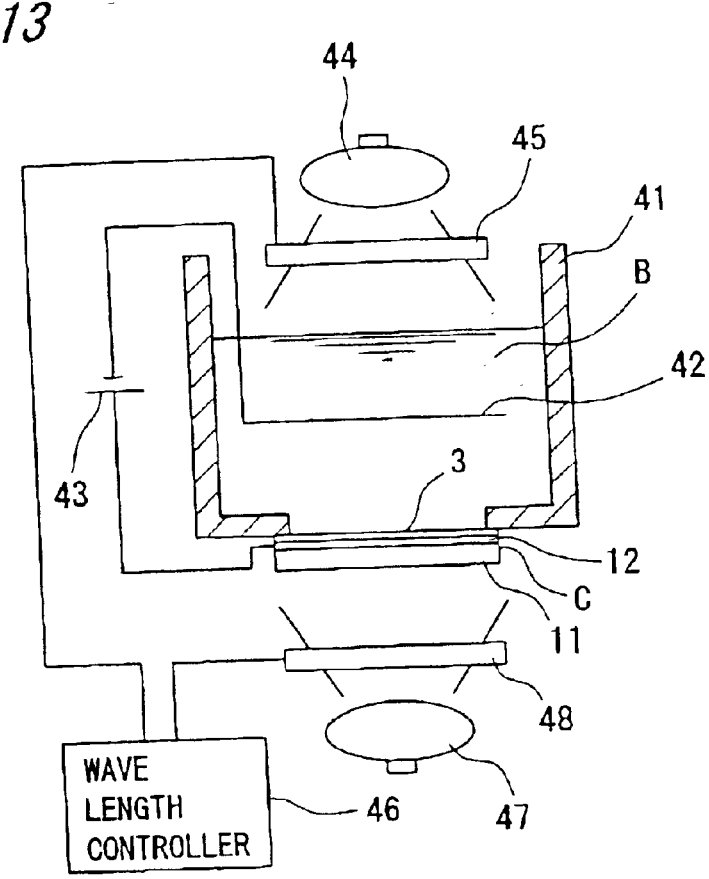
FIG. 13 is a schematic view showing a general construction of an anode oxidizing device employed for manufacturing the electron source.

An anode oxidizing device shown in FIG. 13 is employed in the anodic oxidation processing step. A basic construction of the anode oxidizing device shown in FIG. 13 is substantially identical to the anode oxidizing device according to the first embodiment (refer to FIG. 1). However the following point is different. That is, a light source 47 is disposed on the back face side of the target C. In addition, a filter device 48 capable of changing the wavelength of light is disposed between the light source 47 and the back face of the target C.

However, the light source 47 is similar to the light source 44 disposed on the surface side of the target C. In addition, the filter device 48 is similar to the filter device 45 disposed on the surface side of the target C. Namely, in the anode oxidizing step of the second embodiment, light is emitted from both sides in the thickness direction of the target C. In addition, a wavelength controller device 46 controls the filter devices 45 and 48 each so that the transmission wavelengths of both filter devices 45 and 48 are identical to each other.

Therefore, as has been described in the first embodiment, in the case where the transmission wavelength of the filter device 45 is changed based on an elapse of time after anodic oxidation has started, the transmission wavelength of the filter 48 as well is changed based on an elapse of time after anodic oxidation has started. In the second embodiment, a platinum electrode 42 is employed as a cathode, the electrically conductive layer 12 that is a lower electrode is employed as an anode, and power is supplied between the anode and cathode, whereby the porous polycrystalline silicon layer 4 is formed.

In the meantime, in the above described first embodiment, light from the surface side of the polycrystalline side of the polycrystalline silicon layer 3 is emitted from the light source 44 to the polycrystalline silicon layer 3 that is a semiconductor layer, and thus, a hole can be efficiently supplied on the surface side of the polycrystalline silicon layer 3. However, when the polycrystalline silicon layer 3 is made more porous, the band gap increases. Thus, larger energy is required to make the layer porous. That is, it is required to reduce the wavelength of light. When the wavelength of light is reduced, the light invasion depth is reduced.

However, in the anode oxidizing device of the second embodiment, lights are emitted respectively from both sides in the thickness direction of the porous silicon layer 3, thus easily making the polycrystalline silicon layer 3 porous. That is, in the anode oxidizing device of the second embodiment, a hole can be efficiently supplied on both sides in the thickness direction of the polycrystalline silicon layer 3 (on a surface of the polycrystalline silicon layer 3 and a surface opposite to the surface). Thus, even in the case where the thickness of the polycrystalline silicon layer 3 is comparatively large, this can be easily processed. When the wavelengths of lights emitted respectively from both sides in the thickness direction of the polycrystalline silicon layer 3 are changed synchronously, the sizes of the silicon nanocrystals 63 contained in the porous polycrystalline silicon layer 4 can be uniformed in the thickness direction of the porous polycrystalline silicon layer 4.

Figure 12C:
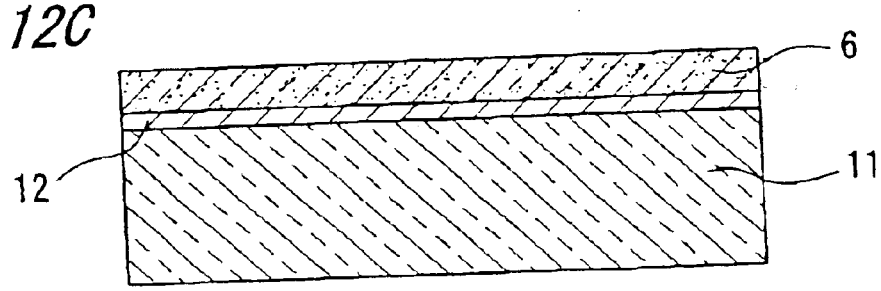

After this anodic oxidation processing step has terminated, the porous polycrystalline silicon layer 4 is oxidized in accordance with the oxidizing step. In this manner, the drift layer 6 consisting of an oxidized porous polycrystalline silicon layer is formed, and a structure shown in FIG. 12C is obtained. In the oxidizing step, the porous polycrystalline silicon layer 4 is oxidized in accordance with the rapid heating technique, and the drift layer 6 containing the above described grain 51, silicon nanocrystal 63, and silicon oxide films 52 and 64 is formed. In the oxidizing step using the rapid heating technique, as is the case of the first embodiment, a lamp annealing device is employed. An operating condition such as atmosphere or temperature in this oxidizing step is similar to that in the first embodiment.

Figure 12D:
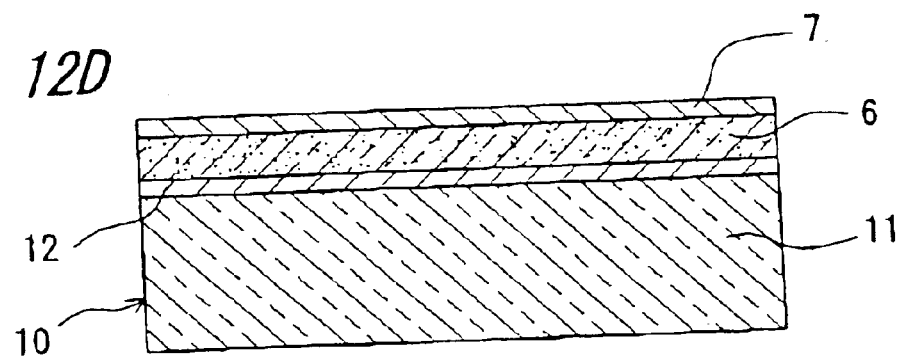

After the drift layer 6 has been formed, a first thin film layer consisting of a metal layer (Cr film in the second embodiment) is deposited on the drift layer 6 in accordance with the electron beam vapor deposition technique. Further, a second thin film consisting of a metal film (Au film in the second embodiment) is deposited on the first thin film layer in accordance with the electron beam vapor deposition technique. In this manner, the surface electrode 7 consisting of the first thin film layer and the second thin film layer is formed, and the electron source 10 shown in FIG. 12D is obtained In the second embodiment, the surface electrode 7 is formed in accordance with the electron beam vapor deposition technique. However, as a method of forming the surface electrode 7, for example, a sputtering technique may be employed without being limited to the electron beam vapor deposition technique.

In this manner, with a method of manufacturing the electron source 10 according to the second embodiment, as is the case of the first embodiment, the size or distribution of silicon nanocrystals contained in the porous polycrystalline silicon layer 4 that is a porous semiconductor layer can be controlled. In addition, the porous polycrystalline silicon layer 4 in which silicon nanocrystals are distributed to be continuously connected to each other can be formed. In this manner, the size or distribution of the silicon nanocrystals 63 contained in the drift layer 6 can be controlled. As a result, in the electron source 10 according to the second embodiment as well, as in the first embodiment, electron scattering in the drift layer 6 can be reduced as compared with the prior art. In addition, the dielectric strength and electron emission efficiency are improved. Further, the service life of the electron source 10 is extended, and the in-plane uniformity of electron emission characteristics is improved, whereby a larger area can be obtained.

In the meantime, in the first and second embodiments, the drift layer 6 is composed of the oxidized porous polycrystalline silicon layer. However, the drift layer 6 may be composed of the nitride porous polycrystalline silicon layer and the oxi-nitride porous polycrystalline silicon layer. Alternatively, in another technique, the drift layer may be composed of an oxidized, nitride, or oxi-nitride porous semiconductor layer.

In the case where the drift layer 6 is a nitride porous polycrystalline silicon layer, for example, the nitriding step of carrying out nitriding in accordance with the rapid heating technique for setting a temperature rise velocity as in the first and second embodiments by utilizing $NH_3$ gas, for example, instead of the oxidizing step of oxidizing the porous polycrystalline silicon layer 4 in accordance with the rapid heating technique utilizing $O_2$ gas. In this case, either of the silicon oxide films 52 and 64 described in FIG. 4 are obtained as silicon nitride films. In the case where the drift layer 6 is an oxi-nitride porous polycrystalline silicon layer, the oxi-nitriding step of oxi-nitriding the temperature rise velocity in accordance with the rapid heating technique for setting the temperature rise velocity as in the first and second embodiments by utilizing a mixture gas of $O_2$ gas and $NH_3$ gas, or alternatively, $N_2O$ gas may be employed instead of the step of oxidizing the porous polycrystalline silicon layer 4 in accordance with the rapid heating technique. In this case, the silicon oxide films 52 and 64 described with respect to FIG. 4 both are obtained as silicon oxi-nitride films.

In addition, in the method of manufacturing the electron source according to the first and second embodiments, a silicon oxide film 64 that is an insulating film is formed by utilizing the rapid heating technique. However, the silicon oxide film 64 may be formed in accordance with the electrochemical method. In this case, for example, an oxidization processing vessel containing an electrolytic solution (such as 1 mol of $H_2SO_4$, 1 mol of $HNO_3$, or aqua regia, for example) is utilized. Then, a platinum electrode (not shown) is employed as a negative polarity, and the lower electrode is employed as a positive polarity (n-type silicon substrate having ohmic electrode 2 formed thereon in the first embodiment and electrically conductive layer 12 in the second embodiment), and the porous polycrystalline silicon layer 4 is oxidized by supplying a constant current, whereby the drift layer 6 containing the grain 51, silicon nanocrystal 63, and silicon oxide films 52 and 64 is formed. An insulating film formed in accordance with the electrochemical method may be employed as a nitride film such as silicon nitride film.

In addition, in the first and second embodiments, a pair of electrodes are composed of the surface electrode 7 and the lower electrode, and the drift layer 6 is interposed between the pair of electrodes, thereby configuring an electron travel layer where electrons travel.

Third Embodiment

Figure 14:
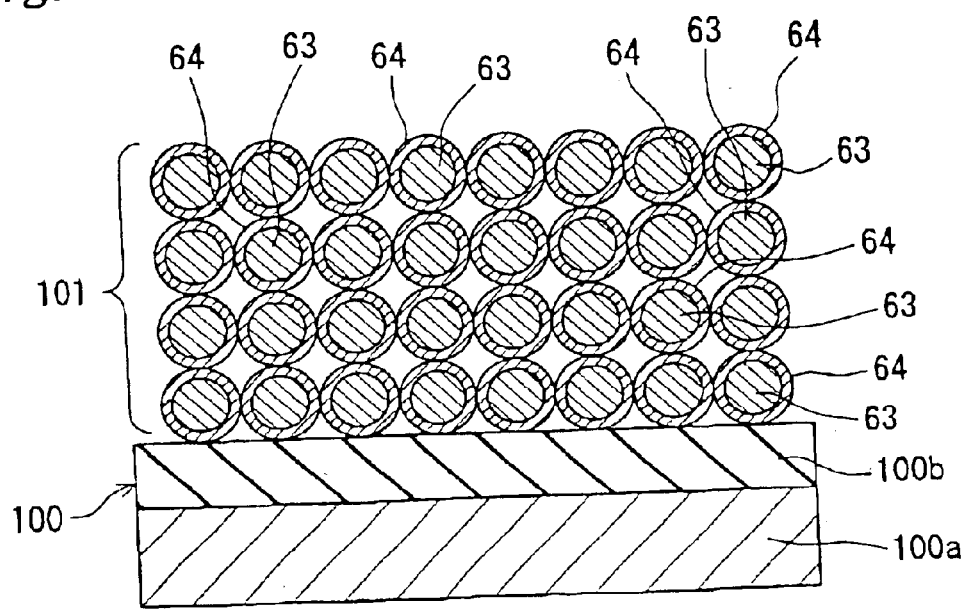
FIG. 14 is a view showing a general construction of a memory element according to a third embodiment.

Hereinafter, a third embodiment of the present invention will be described. In the third embodiment, a memory element formed by utilizing anodic oxidation processing will be described. The memory element according to the third embodiment has a basic construction as shown in FIG. 14. That is, a storage layer 101 is formed on a substrate 100 on which an insulating layer 100$b$ is formed on an electrically conductive layer 100$a$. The storage layer 101 is formed by employing the anode oxidizing device described in the first and second embodiments. In the storage layer 101, there are continuously connected silicon nanocrystals 63 that are a number of semiconductor nanocrystals with nanometer order capable of closing a carrier, the crystals being covered with the silicon oxide film 64 that is an insulating film. The crystalline particle sizes of a number of silicon nanocrystals 63 in the storage layer 101 are identical to each other. The film thickness of the silicon oxide film 64 is smaller than the crystalline particle size of the silicon nanocrystal 63.

Figure 15:
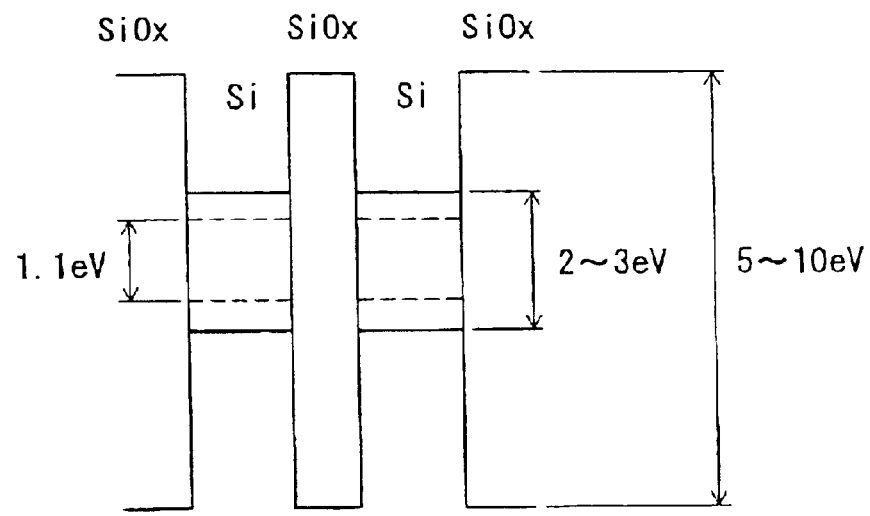
FIG. 15 is a band chart of the memory element.

The storage layer 101 has a band structure as shown in FIG. 15. That is, the storage layer 101 has a multiple quantum well structure in which Si (silicon nanocrystal 63) is sandwiched between SiOx (silicon oxide films 64). The band gap between the silicon oxide films 64 is about 5 eV to 10 eV. The band gap between the silicon nanocrystals 63 is about 2 eV to 3 eV. It is known that the band gap between bulk is about 1.1 eV and the band gap between nanocrystals extends to about 2 eV to 3 eV.

In the third embodiment, in the storage layer 101, the silicon nanocrystal 63 is sandwiched between the barriers of the silicon oxide films 64. Thus, a memory function for storing information can be achieved by closing a carrier in the silicon nanocrystal 63 (by storing a charge). As has been described previously, the band gap between the silicon nanocrystals 63 is large as compared with a bulk. Thus, for example, in the case of a silicon nanocrystal formed during thin film growth, silicon nanocrystals exists to be isolated in the bulk, thus making it difficult to close a carrier in the silicon nanocrystal. In contrast, in the third embodiment, the silicon nanocrystals 63 covered with the silicon oxide films 64 are formed to be continuously connected to each other, thus making it possible to close a carrier in the silicon nanocrystal 63.

The memory element according to the third embodiment includes a storage layer 101 for storing information by dosing a carrier in the silicon nanocrystal 63 with nanometer order covered with the silicon oxide films 64 that are insulating films, the crystal being capable of dosing the carrier (by storing a charge). A charge is stored in the silicon nanocrystal 63 with nanometer order, and thus, a memory element of its small size and with its low cost and large storage capacity can be achieved as compared with a semiconductor memory utilizing a conventional semiconductor integrated circuit technology.

In the storage layer 101, writing is carried out by writing means (not shown). In a unit region of the storage layer 101, carriers can be dosed in a plurality of silicon nanocrystals 63, whereby the carriers can be dosed in a plurality of silicon nanocrystals 63 by writing means. On the other hand, the storage layer 101 stores information on multi-values according to the number of silicon nanocrystals 63 dosed in a carrier, whereby the information on multi-values can be stored in the storage layer 101.

As writing means, there may be employed means for carrying out writing into the storage layer 101 by light emission, for example. If the writing means is designed to control an amount of charge stored in the storage layer 101 by changing the wavelength of light, the wavelength of light emitted to the storage layer 101 is changed, whereby the depth of light invasion into the storage layer 101 can be controlled. As the wavelength of light increases, a carrier can be closed in the silicon nanocrystal 63 with a deeper region in the storage layer 101. In addition, a carrier can be closed in the silicon crystal with its larger crystalline particle size. As the wavelength of light is reduced, a carrier can be closed in the silicon nanocrystal 63 with a shallower region in the storage layer 101. In addition, a carrier can be closed in the silicon nanocrystal with its smaller crystalline particle size. Thus, the number of silicon nanocrystals 63 closed in a carrier can be controlled, and an amount of charge stored in the storage layer 101 can be controlled. In addition, if the writing means is designed to control an amount of charge stored in the storage layer 101 by changing the intensity of light, the number of silicon nanocrystals 63 for dosing a carrier can be controlled by changing the intensity of light emitted to the storage layer 101, and an amount of charge stored in the storage layer 101 can be controlled.

As writing means, there may be employed means for electrically carrying out writing into the storage layer 101. In this case, if an amount of charge stored in the storage layer 101 is controlled by changing a voltage applied to the storage layer 101, information on multi-values can be electrically written into the storage layer 101.

In addition, if the storage layer 101 is designed to store information based on a location of the silicon nanocrystal 63 closed in a carrier, the storage capacity can be increased more significantly. Therefore, if the writing means is designed to control a location for storing a charge in the storage layer 101 by changing the wavelength of light, the depth of light invasion into the storage layer 101 can be controlled by changing the wavelength of light emitted to the storage layer 101. As the wavelength of light increases, a carrier can be closed in the silicon nanocrystal 63 with its deeper region in the storage layer 101 can be closed, and a carrier can be closed in the silicon nanocrystal 63 with its large crystalline particle size. As the wavelength of light is reduced, a carrier can be closed in the silicon nanocrystal 63 with its shallower region in the storage layer 101. In addition, a carrier can be closed in the silicon nanocrystal 63 with its smaller crystalline particle size. Thus, the location of the silicon nanocrystal 63 for closing a carrier can be controlled.

Here, by employing the anode oxiding device in the first embodiment, if the storage layer 101 is designed so that the crystalline particle size of the silicon nanocrystal 63 is reduced as the crystal is distant from the n-type silicon substrate 1 in the thickness direction, for example, an optical gap between the silicon nanocrystals 63 changes in the depth direction of the storage layer 101. Thus, the write precision in the depth direction of the storage layer 101 can be improved.

In the memory element according to the third embodiment, for example, assuming that the silicon nanocrystals of 5 nm in crystalline particle size covered with the silicon oxide film 64 are arranged on the n-type silicon substrate of 2.54 cm×2.54 cm (namely, 1 inch □), the following relationship is established.

$$(2.54 \times 10^{-2}/5 \times 10^{-9})^2 \approx 2.58 \times 10^{13} > 1 \times 10^{12}$$

Figure 16:
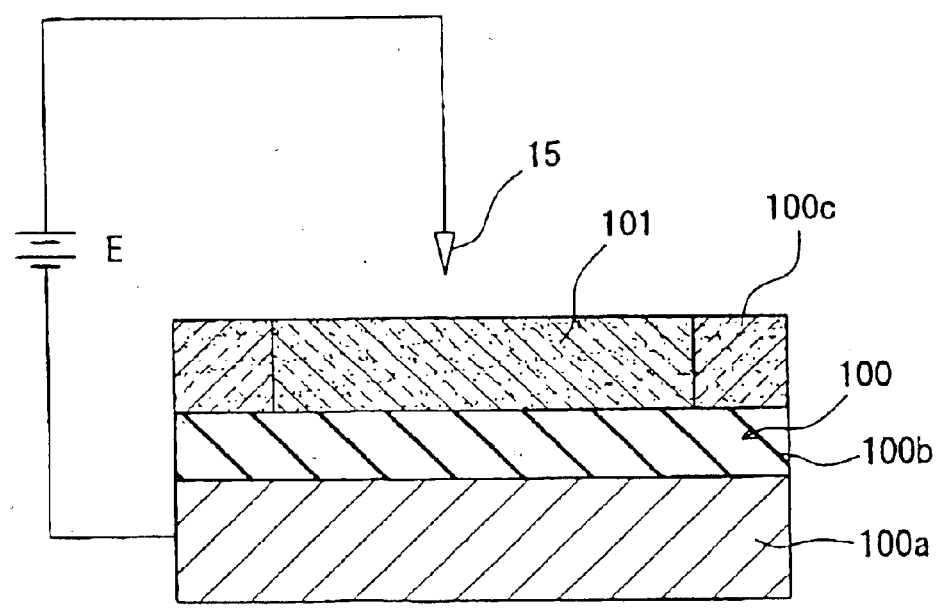
FIG. 16 is a view showing another exemplary construction of the memory element.

Therefore, 1-bit information is stored in one silicon nanocrystal 63, whereby a large capacity memory of 0.155 Tbit/cm$^2$ (1 Tbit/inch$^2$) can be achieved As shown in FIG. 16, a probe 15 for applying an electric field to the storage layer 101 may be provided. In this case, an electrically conductive layer 100a is connected to a negative polarity of a direct current power source E, and the probe 15 is connected to a positive polarity of the direct current power source E. Then, the tip end of the probe 15 is close to the storage layer 101, and an electric field is applied to the storage layer 101 by means of the probe 15. By doing this, a pair of electron and hole generated in the silicon nanocrystal 63 can be separated. As a result, the service life of a carrier closed in the silicon nanocrystal 63 can be extended, and the storage time can be extended.

The electrically conductive layer 100a, insulating layer 100b, and silicon layer 100c in FIG. 16 can be composed of, for example, a silicon substrate on SIMOX (Separation by Implanted Oxygen) substrate, an SiO$_2$ film on the silicon substrate, and a silicon layer on the SiO$_2$ film, respectively. However, of course, the electrically conductive layer 100a may be composed of a metal layer or another material having electrical conductivity without utilizing the SIMOX substrate.

The information stored in the storage layer 101 can be erased or read out by emitting light with a proper wavelength or proper intensity that is different from that when the information is written by light emission to the storage layer 101, for example.

The storage layer 101 in the above described memory element is formed in accordance with the following procedures. That is, a polycrystalline silicon layer is formed on one surface of a substrate 100 in accordance with the CVD technique, for example. This polycrystalline silicon layer is made porous in accordance with anodic oxidation processing, whereby the silicon nanocrystal 63 with nanometer order on which a quantum containment effect appears is formed. Then, a silicon oxide film 64 is formed on the surface of the silicon nanocrystal 63 in accordance with oxidization processing such as RTO technique, for example. In this manner, a number of the silicon nanocrystals 63 with nanometer order covered with the silicon oxide film 64 can be provided to be close to each other in a three-dimensional manner. Thus, the storage layer 101 having its multiple quantum well structure shown in FIG. 15 can be formed. Therefore, there can be provided a memory device of its small size and with its low cost and large capacity.

In the case where the electrically conductive layer 100a is formed as an electrically conductive thin film on the glass substrate, a process for manufacturing a TFT for driving a general liquid crystal display employing the glass substrate as a substrate can be diverted. In addition, a TFT manufacturing apparatus can be diverted.

The storage layer 101 can be employed as a new memory instead of the existing semiconductor memory such as flash memory.

Figure 17:
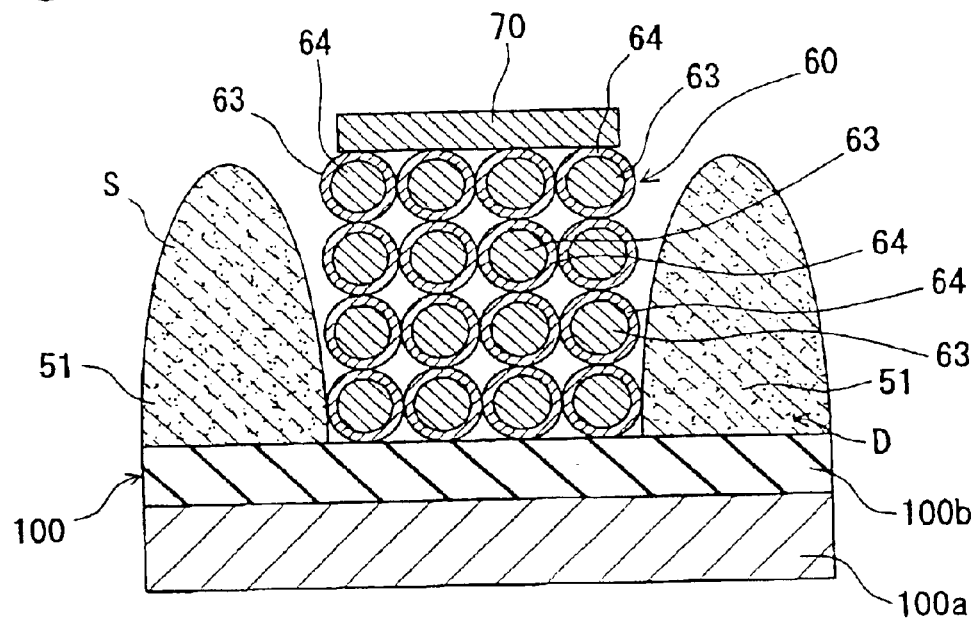
FIG. 17 is a view showing an application example of the memory element.

For example, as shown in FIG. 17, the silicon nanocrystal 63 with its nanometer order covered with the silicon oxide film 64 that is an insulating film is provided between columnar grains (semiconductor crystals) 51 of polycrystalline silicon. Here, a pair of grains 51, 51 are provided as drain D and source S, respectively, A portion consisting of silicon nanocrystals 63 with nanometer order interposed between the pair of grains 51, 51 and covered with the silicon oxide film 64 is provided as a gate oxide film 60 (storage layer 101). The electrically conductive film formed on the gate oxide film 60 is provided as a gate electrode 70. Thus, a MOS transistor structure can be obtained, and multi-values can be stored. Such a MOS transistor structure can be manufactured in self-alignment manner in accordance with the following procedures. That is, one surface side of the substrate 100, for example, a polycrystalline silicon layer is formed in accordance with the CVD technique. The polycrystalline silicon layer is made porous in accordance with anodic oxidation processing, and there is formed the silicon nanocrystal 63 with nanometer order in which there appears an effect of containing a columnar semiconductor crystal and quantum, the crystal consisting of polycrystalline silicon grains 51. Then, for example, the silicon oxide film 64 is formed as an insulating film on the surface of the silicon nanocrystal 63 in accordance with oxidization processing such as RTO technique.

In the third embodiment, the insulating film formed on the surface of the silicon nanocrystal 63 is provided as a silicon oxide film 64. However, a silicon nitride film or a silicon oxi-nitride film may be formed instead of the silicon oxide film 64.

Fourth Embodiment

Hereinafter, a fourth embodiment of the present invention will be described. However, an electron source and a manufacturing method thereof according to the fourth embodiment are identical to those according to the first embodiment in basic construction and functions. The fourth embodiment will be described with reference to FIG. 2A to FIG. 2D and FIG. 3 and FIG. 4.

In the fourth embodiment, as in the first embodiment, a single-crystalline n-type silicon substrate with its resistivity comparatively close to the resistivity of a conductor (for example, a (100) substrate whose resistivity is substantially 0.01 Ω/cm to 0.02 Ω/cm) is employed as an electrically conductive substrate.

As shown in FIG. 3, in the electron source 10 according to the fourth embodiment, as in the first embodiment, there are formed an n-type silicon substrate 1, an ohmic electrode 2, a drift layer 6, and a surface electrode 7. The structure and functions of these elements are similar to those of the electron source 10 according to the first embodiment. A description thereof is omitted here.

In addition, in the electron source 10 according to the fourth embodiment as well, an electron is emitted in a mechanism and model similar to a case of the first embodiment.

Hereinafter, a method of manufacturing the electron source 10 according to the fourth embodiment will be described with reference to FIG. 2A to FIG. 2D.

First, the ohmic electrode 2 is formed on a back face of the n-type silicon substrate 1. Then, a non-doped polycrystalline silicon layer 3 is formed as a semiconductor layer on a main surface of the n-type silicon substrate 1, and a structure shown in FIG. 2A is obtained. For example, as a method of film forming the polycrystalline silicon layer 3, there can be employed a CVD technique, a sputtering technique, or a CGS technique and the like.

After a non-doped polycrystalline silicon layer 3 has been formed, the polycrystalline silicon layer 3 is made porous in accordance with the anodic oxidation processing step, and a porous polycrystalline silicon layer 4 that is a porous semiconductor layer is formed. In this manner, a structure shown in FIG. 2B is obtained.

Figure 18:
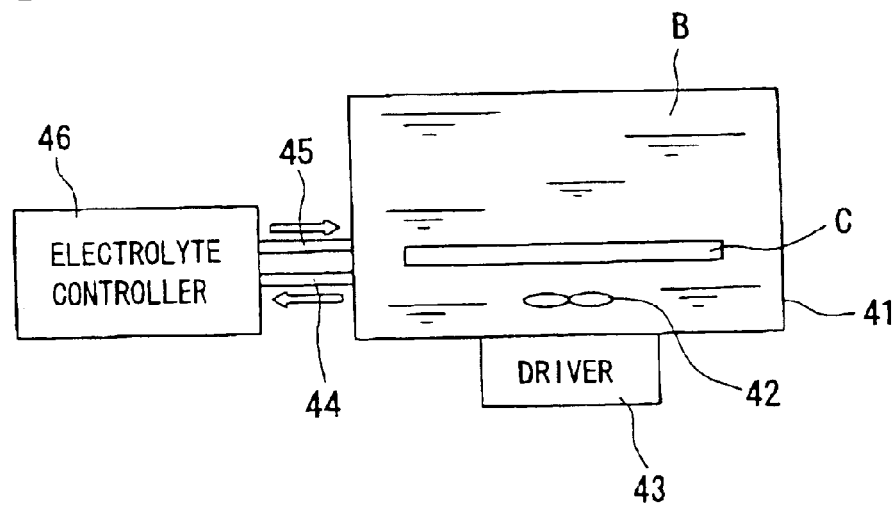
FIG. 18 is a schematic view depicting a general construction of an anode oxidizing device employed for manufacturing the electron source according to a fourth embodiment.

The anode oxidizing device is employed in the anodic oxidation processing step. In the anode oxidizing device shown in FIG. 18, a target C comprising a lower electrode and the polycrystalline silicon layer 3 is immersed in an electrolytic solution B contained in a processing vessel 41 (alternatively, only the polycrystalline silicon layer 3 in the target C is brought into contact with the electrolytic solution B). Then, when a platinum electrode (not shown) is employed as a negative polarity, and an n-type silicon substrate 1 (ohmic electrode 2) in the target C is employed as a positive polarity, anodic oxidation is carried out at a constant current while light is emitted from a light source to the polycrystalline silicon layer 3 (not shown). In this manner, a porous polycrystalline silicon layer 4 is formed. As the electrolytic solution B, there is utilized a mixture liquid obtained by mixing 55 wt % of hydrogen fluoride water solution and ethanol at 1:1. The electrolytic solution B consists essentially of fluoric acid, and a liquid for use in a general semiconductor manufacturing process can be used as the electrolytic solution B. The temperature and concentration of the electrolytic solution B in the processing vessel 41 is managed by an electrolytic solution managing device 46. The electrolytic solution managing device 46 includes a management vessel (not shown). The electrolytic solution of the processing vessel 41 is introduced into the management vessel through the electrolytic solution pipe 44. In the management vessel, the temperature and concentration of the electrolytic solution B are controlled so as to be maintained at the respective settings. The electrolytic solution B of the management vessel is delivered to the processing vessel 41 through the electrolytic solution delivery pipe 45. Namely, the electrolytic solution B is circulated between the processing vessel 41 and the management vessel. A rotary wing 42 (stir) is provided in the processing vessel 41. The rotary wing 42 is driven by a driver device 43 and rotates and stirs the electrolytic solution B in the processing vessel 41.

In the fourth embodiment, a stirring device consisting of the rotary wing 42 and the driver device 43; and the electrolytic solution managing device 46 configure management means for managing the concentration of the electrolytic solution B in the processing vessel 41 so that the in-plane of the polycrystalline silicon layer 3 that is a semiconductor layer is made porous at the same velocity. The thus formed porous polycrystalline silicon layer 4 contains polycrystalline silicon grains and silicon nanocrystals. In the fourth embodiment, although all of the polycrystalline silicon layer 3 is made porous, part of the layer may be made porous. The managing means includes a stirring device and an electrolytic solution managing device. Further, a device for finely moving the target C comprising the polycrystalline silicon layer 3 that is the lower electrode and semiconductor layer may be added to the managing means. The managing means may include at least a stirring device. Further, it is desirable that the managing means includes the electrolytic solution managing device 46 and the device for finely moving the target C.

After the anodic oxidation processing step has terminated, the porous polycrystalline silicon layer 4 is oxidized in the oxidizing step. In this manner, the drift layer 6 consisting of an oxidized porous polycrystalline silicon layer is formed, and a structure shown in FIG. 2C is obtained. In the oxidizing step, the porous polycrystalline silicon layer 4 is oxidized by the rapid heating technique, and the drift layer 6 containing the grams 51, silicon nanocrystals 63, and silicon oxide films 52 and 64 is formed. A lamp annealing device is employed in the oxidizing step using the rapid heating technique. The substrate temperature is risen at a predetermined temperature rise velocity (for example, 80° C./sec) from room temperature to a predetermined oxidizing temperature (for example, 900° C.), and is maintained for a predetermined oxidizing time (for example, one hour). Then, the rapid thermal oxidization (RTO) is carried out. Then, the substrate temperature is lowered to room temperature. In the fourth embodiment, the temperature rise velocity is set to 80° C./sec or more. However, the temperature rise velocity may be set to 80° C./sec, and it is preferable to set the velocity to 160° C./sec or more.

After the drift layer 6 has been formed, the first thin film layer consisting of the metal film (Cr film in the fourth embodiment) is deposited on the drift layer 6 in accordance with an electron beam vapor deposition technique. Further, the second thin film layer consisting of the metal film (Au film in the fourth embodiment) is deposited on the first thin film layer in accordance with the electron beam vapor deposition technique. In this manner, the surface electrode 7 consisting of the first and second thin film layer, then an electron source 10 shown in FIG. 2D is obtained. In the fourth embodiment, the surface electrode 7 is formed in accordance with the electron beam vapor deposition technique. However, the method for forming the surface electrode 7 is not limited to the electron beam vapor deposition technique, and the sputtering technique may be employed, for example.

In the electron source 10 formed by this manufacturing method, the dielectric strength is improved, and the service life is extended as compared with the prior art. In addition, the in-plane uniformity of the electron emission characteristics (such as current density of emission current or electron emission efficiency) is improved. This is because, in the anodic oxidation processing step, the size and distribution fineness of the silicon nanocrystals 63 in the drift layer 6 becomes fully uniform by employing the managing means.

In anodic oxidation of the polycrystalline silicon layer 3 that is a semiconductor layer (silicon layer), it is known that porous filing or electrolytic polishing occurs because of a tradeoff between a supply amount of F ion and a supply amount of hole. In the case where the supply amount of F ion is more than that of hole, porous filming occurs, and the silicon nanocrystal 63 is formed. On the other hand, in the case where a supply amount of hole is more than that of F ion, electrolytic polishing occurs, and the silicon nanocrystal 63 is not formed. However, in the fourth embodiment, the anode oxidizing device includes the stirring device. Thus, the supply amount of F ion to the polycrystalline silicon layer 3 can be restricted from deviating in plane. Moreover, the supply to the polycrystalline silicon layer 3 of F ion that is a reaction specie required for making the polycrystalline silicon layer 3 porous can be accelerated. Thus, the supply amount of F ion can be prevented from being smaller than that of hole. As a result, electrolytic polishing can be prevented from locally occurring partially of the polycrystalline silicon layer 3. In this manner, porous filming is accelerated in the plane of the polycrystalline silicon layer 3 at the substantially same velocity. Therefore, the size and distribution density of the silicon nanocrystals 63 in the porous polycrystalline silicon layer 4 are fully uniformed. As a result, the size and distribution density of the silicon nanocrystals 63 in the drift layer 6 are fully uniformed. In addition, the anode oxidizing device includes an electrolytic solution managing device 46, and thus, the controllability of the velocity of porous filming of the polycrystalline silicon layer 3 is improved. In this manner, the in-plane uniformity of the porous polycrystalline silicon layer 4 can be improved, and reproducibility can be improved.

With the method for manufacturing the electron source 10 according to the fourth embodiment, when the porous polycrystalline silicon layer 4 is formed in the anodic oxidation processing step, the concentration of the electrolytic solution B is managed so that the velocities of porous filming of the polycrystalline silicon layer 3 are identical to each other in the plane of the polycrystalline silicon layer 3. Thus, a process for anodic oxidation is stabilized, and the uniformity and reproducibility of size and distribution of the silicon nanocrystals 63 contained in the porous polycrystalline silicon layer 4 can be improved. As a result, the uniformity and reproducibility of size and distribution density of silicon nanocrystals 63 in the drift layer 6 can be improved. In this manner, the size or distribution of the silicon nanocrystals 63 in the drift layer 6 is uniformed, and the electron scattering in the drift layer 6 can be reduced. Therefore, the dielectric strength can be improved, and the service life can be extended. Further, the electron emission efficiency can be improved. Furthermore, the in-plane uniformity of the electron emission characteristics can be improved, and an area for the electron source can be increased.

Fifth Embodiment

Hereinafter, a fifth embodiment of the present invention will be described. However, an electron source and a method of manufacturing the electron source according to the fifth embodiment are identical to those according to the second embodiment in basic configuration and functions. The fifth embodiment will be described with reference to FIG. 11 and FIG. 12A to FIG. 12D. The electron source and the method of manufacturing it have a plenty of common points to those according to the fourth embodiment.

In the fifth embodiment, as an electronic substrate, there is employed a substrate on which an electrically conductive layer consisting of a metal layer (for example, tungsten film) is provided on one surface of an insulating substrate consisting of a glass substrate (for example, quartz glass substrate).

As shown in FIG. 11, in the electron source 10 according to the fifth embodiment as well, as is substantially similar to the second embodiment, an insulating substrate 11, an electrically conductive layer 12, a drift layer 6, and a surface electrode 7 are formed. A structure and functions of these elements are similar to those of the electron source 10 according to the second embodiment. A description thereof is omitted here.

In the electron source 10 according to the fifth embodiment as well, electrons are emitted in the mechanism and model similar to a case of the second embodiment.

In the case where the electron source 10 according to the fifth embodiment is utilized as an electron source of a display, the lower electrode and surface electrode 7 or the like may be properly patterned.

Hereinafter, a method of manufacturing the electron source 10 according to the fifth embodiment will be described with reference to FIG. 12A to FIG. 12D.

First, on one surface of the insulating substrate 11, an electrically conductive layer 12 consisting of a metal film (for example, tungsten film) is formed in accordance with a sputtering technique, and an electrically conductive substrate is fabricated. Then, on the main surface side of the electrically conductive substrate (on the electrically conductive layer 12), a non-doped polycrystalline silicon layer 3 is formed as a semiconductor layer, and a structure shown in FIG. 12A is obtained. As a method of film forming a polycrystalline silicon layer 3, for example, there is employed a CVD technique, a sputtering technique, or a CGS technique and the like.

After the non-doped polycrystalline silicon layer 3 has been formed, the polycrystalline silicon layer 3 is made porous in the anodic oxidation processing step. In this manner, a porous polycrystalline silicon layer 4 that is a porous semiconductor layer is formed, and a structure shown in FIG. 12B is obtained. In the anodic oxidation processing step, there is employed an anode oxidizing device comprising managing means described in the fourth embodiment (refer to FIG. 18). That is, as in the fourth embodiment, there is employed a processing vessel 41 (refer to FIG. 18) containing the electrolytic solution B consisting of a mixture liquid obtained by mixing 55 wt % of hydrogen fluoride water solution and ethanol by substantially 1:1. Then, with a platinum electrode being a negative polarity and an electrically conductive layer 12 being a positive polarity, while light emission is carried out for the polycrystalline silicon layer 3, anodic oxidation processing is carried out at a constant current. In this manner, the porous polycrystalline silicon layer 4 is formed. The thus formed porous polycrystalline silicon layer 4 contains polycrystalline silicon grains and silicon nanocrystals. In the fifth embodiment, although all of the polycrystalline silicon layer 3 is made porous, only part of the layer may be made porous.

After the anodic oxidation processing step has terminated, the porous polycrystalline silicon layer 4 is oxidized in the oxidizing step. In this manner, a drift layer 6 consisting of an oxidized porous polycrystalline silicon layer is formed, and a structure shown in FIG. 12C. In the oxidizing step, the porous polycrystalline silicon layer 4 is oxidized in accordance with the rapid heating technique. In this manner, the drift layer 6 containing the grain 51, silicon nanocrystal 63 and silicon oxide films 52 and 64 is formed. In the oxidizing step using the rapid heating technique, a lamp annealing device is employed as in the fourth embodiment. An $O_2$ gas atmosphere is produced in a furnace. The substrate temperature is risen at a predetermined temperature rise velocity (for example, 80° C./sec) from room temperature to a predetermined oxidization temperature (for example, 900° C.), and is maintained for a predetermined oxidization time (for example, one hour). Then, rapid thermal oxidization (RTO) is carried out. Then, the substrate temperature is lowered to room temperature. In the fifth embodiment, the temperature rise velocity is set to 80° C./sec. However, as in the fourth embodiment, the temperature rise velocity may be set to 80° C./sec or more, and it is preferable that the velocity be set to 160° C./sec or more.

After the drift layer 6 has been formed, the first thin film layer consisting of a metal film (Cr film in the fifth embodiment) is deposited on the drift layer 6 in accordance with the electron beam vapor deposition technique. Further, the second thin film layer consisting of a metal layer (Au film in the fifth embodiment) is deposited on the first thin film layer in accordance with the electron beam vapor deposition technique. In this manner, a surface electrode 7 consisting of the first thin film layer and the second thin film layer is formed, and a electron source 10 shown in FIG. 12D is obtained. In the fifth embodiment, the surface electrode 7 is formed in accordance with the electron beam vapor deposition technique. However, a method of forming the surface electrode 7 is not limited to the electron beam vapor deposition technique, and, a sputtering technique may be employed, for example.

In this manner, with the method of manufacturing the electron source 10 according to the fifth embodiment, the size and distribution density of silicon nanocrystals 63 in the drift layer 6 become fully uniform. Therefore, electron scattering in the drift layer 6 can be reduced. As a result, the dielectric strength can be improved, and the service life can be extended. Further, the electron emission efficiency can be improved, and the in-plane uniformity of electron emission characteristics can be improved. In addition, an area for the electron source can be increased.

In the fourth and fifth embodiments, the drift layer 6 is composed of an oxidized porous polycrystalline silicon layer. However, the drift layer 6 may be composed of a nitride porous polycrystalline silicon layer or an oxi-nitride porous polycrystalline silicon layer. Alternatively, this layer may be composed of the other oxide, nitride, or oxi-nitride porous semiconductor layer.

In the case where the drift layer 6 is a nitride porous polycrystalline silicon layer, there may be employed the nitriding step of nitriding the temperature rise velocity in accordance with the rapid heating technique set as in the fourth and fifth embodiments employing an $NH_3$ gas, for example, instead of the oxidizing step of oxidizing the porous polycrystalline silicon layer 4 in accordance with the rapid temperature rise velocity employing $O_2$ gas. In this case, both of the silicon oxide films 52 and 64 (refer to FIG. 4) are obtained as silicon nitride films. In the case where the drift layer 6 is an oxi-nitride porous polycrystalline silicon layer, the oxi-nitriding step of oxi-nitriding the temperature rise velocity in accordance with the rapid heating technique set as in the fourth and fifth embodiments employing a mixture gas of $O_2$ gas and $NH_3$ gas, for example, may be employed instead of the step of oxidizing the porous polycrystalline silicon layer 4 in accordance with the rapid heating technique. In this case, both of the silicon oxide films 52 and 64 (refer to FIG. 4) are obtained as silicon oxi-nitride films.

In the manufacturing method according to the fourth and fifth embodiments, the silicon oxide film 64 that is an insulating film is formed by utilizing the rapid heating technique. However, the silicon oxide film 64 may be formed in accordance with an electrochemical method. In this case, for example, an oxidization processing vessel containing an electrolytic solution (such as 1 mol of $H_2SO_4$, 1 mol of $HNO_3$, or aqua regia, for example) is employed. Then, with a platinum electrode (not shown) being a negative polarity and a lower electrode being a positive polarity, a constant current is supplied, and the porous polycrystalline silicon layer 4 is oxidized, whereby the drift layer 6 containing the grain 51, silicon nanocrystal 63, and silicon oxide films 52 and 64 is formed. Of course, the insulating film formed in accordance with the electrochemical method may be employed as a nitride film such as silicon nitride film.

Sixth Embodiment

Hereinafter, a sixth embodiment of the present embodiment will be described. However, an electron source and a method of manufacturing the electron source according to the sixth embodiment are identical to those according to the first embodiment in basic configuration and functions. The sixth embodiment will be described with reference to FIG. 2A to FIG. 2D and FIG. 3 and FIG. 4.

In the sixth embodiment, as in the first embodiment, as an electronic conductive substrate, there is employed a single-crystalline n-type silicon substrate (for example, a (100) substrate with a resistivity of substantially 0.01 Ω cm to 0.02 Ω cm) whose resistivity is comparatively close to that of a conductor.

As shown in FIG. 3, in the electron source 10 according to the sixth embodiment as well, as in the first embodiment, an n-type silicon substrate 1, an ohmic electrode 2, a drift layer 6, and a surface electrode 7 are formed. A structure and functions of these elements are similar to those of the electron source 10 according to the first embodiment. A description thereof is omitted here.

In addition, as shown in FIG. 4, in the electron source 10 according to the sixth embodiment as well, electrons are emitted in the mechanism and model similar to a case of the first embodiment.

Hereinafter, a method of manufacturing the electron source 10 according to the sixth embodiment will be described with reference to FIG. 2A to FIG. 2D.

First, the ohmic electrode 2 is formed on a back face of the n-type silicon substrate 1. Then, on a main surface of the n-type silicon substrate 1, a non-doped polycrystalline silicon layer 3 is formed as a semiconductor layer, and a structure shown in FIG. 2A is obtained. As a method of film forming the polycrystalline silicon layer 3, for example, there are a CVD technique, a sputtering technique, and a CGS technique or the like.

After the non-doped polycrystalline silicon layer 3 has been formed, the polycrystalline silicon layer 3 is made porous in the anodic oxidation processing step. In this manner, the porous polycrystalline silicon layer 4 that is a porous semiconductor layer is formed, and a structure shown in FIG. 2B is obtained. In the anodic oxidation processing step, there is employed an anodic oxidation processing vessel containing an electrolytic solution that consists of a mixture liquid obtained by mixing 55 wt % of hydrogen fluoride water solution and ethanol by substantially 1:1. Then, with a platinum electrode (not shown) being a negative polarity and the n-type silicon substrate 1 (ohmic electrode 2) being a positive polarity, while light emission is carried out for the polycrystalline silicon layer 3, anodic oxidation is carried out at a constant current. In this manner, a porous polycrystalline silicon layer 4 is formed. The thus formed porous polycrystalline silicon layer 4 has grains and silicon nanocrystals that are sources of the grain 51 and silicon nanocrystal 63, respectively. In the sixth embodiment, although all of the polycrystalline silicon layer 3 is made porous, only a part of the layer may be made porous.

After the anodic oxidation processing step has terminated, the rinse step of removing the electrolytic solution that remains in the porous polycrystalline silicon layer 4 is carried out. Then, the porous polycrystalline silicon layer 4 is oxidized in the oxidizing step that is the insulating film forming step. In this manner, the drift layer 6 consisting of an oxidized porous polycrystalline silicon layer is formed, and a structure shown in FIG. 2C is obtained.

In the rinse step, first, rinsing is carried out for a first predetermined time (for example, about several minutes to 10 minutes) with pure water. Then, in order to replace pure water, immersing into methyl alcohol that is a water soluble organic solvent (hydrophilic organic solvent) for a second predetermined time (for example, about 1 to 5 minutes) is carried out about 3 to 5 times. Subsequently, immersing into that is a non-water soluble organic solvent for the third predetermined time (for, example, about 1 to 5 minutes) is carried out about 3 to 5 times. As a water soluble organic solvent, there may be employed ethyl alcohol (95% or more in concentration) or isopropyl alcohol (99% or more in concentration) and the like instead of employing methyl alcohol (99% or more in concentration). As a non-water soluble organic solvent, benzene (99.5% or more in concentration) may be employed instead of employing hexane (96% or more in concentration).

In the oxidizing step, an oxidization processing vessel containing an electrolytic solution (such as diluted sulfuric acid, diluted nitric acid, or aqua regia, for example). With the platinum electrode (not shown) being a negative polarity and the n-type silicon substrate 1 (ohmic electrode 2) being a positive polarity, a constant current is supplied, whereby the porous polycrystalline silicon layer 4 is electrochemically oxidized. In this manner, the drift layer 6 containing the grain 51, silicon nanocrystal 63 and silicon oxide films 52 and 64 is formed. In the oxidizing step, the porous polycrystalline silicon layer 4 is electrochemically oxidized. However, the porous polycrystalline silicon layer 4 may be oxidized by the rapid heating technique (rapid thermal oxidization technique) using a lamp annealing device.

After the drift layer 6 has been formed, the surface electrode 7 consisting of a gold thin film is formed on the drift layer 6, and the electron source 10 shown in FIG. 2D is obtained. In the sixth embodiment, the surface electrode 7 is formed in accordance with the electron beam vapor deposition technique. However, the method of forming the surface electrode 7 is not limited to the electron beam vapor deposition technique, and a sputtering technique may be employed, for example.

In the method of manufacturing the electron source 10 according to the sixth embodiment, the step of forming the drift layer 6 includes: the anodic oxidation processing step of forming the porous polycrystalline silicon layer 4 in accordance with anodic oxidation employing an electrolytic solution; the rinse step of removing the electrolytic solution that remains in the porous polycrystalline silicon layer 4; and the insulating film forming step of oxidizing the porous polycrystalline silicon layer 4, thereby forming insulating films (silicon oxide films 52 and 64) respectively on the surfaces of the grain 51 and silicon nanocrystal 63. Thus, the electrolytic solution or the like that remains in the porous polycrystalline silicon layer 4 formed in the anodic oxidation processing step can be removed before the insulating film forming step. In addition, the quality of the insulating film (silicon oxide films 52 and 64) formed on the surface of a respective one of the grain 51 and silicon nanocrystal 63 can be improved in the insulating film forming step. As a result, the dielectric strength of the electron source 10 can be improved, and the service life can be extended as compared with the prior art.

In the rinse step, after rinsing using pure water, rinsing employing non-water soluble organic solvent is carried out. That is, before rinsing with non-water soluble solution, rinsing is carried out with pure water, and thus, the remaining impurities such as fluorine can be removed within a short time. Moreover, before rinsing with non-water soluble solution, rinsing is carried out with pure water, and further, pure water is replaced with water soluble organic solvent. Thus, by rinsing employing water soluble organic solvent, the water content remaining in the porous polycrystalline silicon layer 4 can be removed from the porous polycrystalline silicon layer 4. As a result, the water content can be remained from remaining in the porous polycrystalline silicon layer 4.

In the sixth embodiment, as a water soluble organic solvent, there is employed a lower alcohol such as methyl alcohol, ethyl alcohol, or isopropyl alcohol. These alcoholic solvents have a small number of carbons in molecule, and are relatively small in molecular weight. Because of this, these solvents easily permeate into a fine structure (fine porous structure) such as porous polycrystalline silicon layer 4. Thus, the water content remaining in the porous polycrystalline silicon layer 4 can be removed within a comparatively short time. Methyl alcohol is preferable in small molecular weight, but is not preferable in toxicity. Therefore, by employing ethyl alcohol instead of methyl alcohol, handing can be facilitated, and safety can be improved.

As a non-water soluble organic solvent, there is employed an organic solvent whose boiling point does not exceed 100°

C. and whose melting point does not exceed 20° C. such as hexane or benzene. Such non-soluble organic solvent is highly volatile, and easily evaporates. Thus, the non-water soluble solvent can be prevented from remaining in the porous polycrystalline silicon layer 4. In addition, there is no need to prepare specific environment or equipment in the rinse step. Thus, an increase in manufacturing cost caused by facility investment can be prevented.

Seventh Embodiment

Hereinafter, a seventh embodiment of the present invention will be described. An electron source according to the seventh embodiment and a method of manufacturing the electron source are identical to those according to the second embodiment in basic configuration and functions. The seventh embodiment will be described with reference to FIG. 11 and FIG. 12A to FIG. 12D. The electron source and the manufacturing method according to the seventh embodiment have a plenty of common points to those according to the sixth embodiment.

In the seventh embodiment, as an electrically conductive substrate, there is employed a substrate on which an electrically conductive layer consisting of a metal film (for example, tungsten layer) is provided on one surface of an insulating substrate consisting of a glass substrate. In the case where the electrically conductor layer is thus formed on one surface side of the insulating substrate, a larger area and cost reduction of the electron source is made possible as compared with a case in which a semiconductor substrate is employed as an electrically conductive substrate as in the sixth embodiment.

As shown in FIG. 11, in the electron source 10 according to the seventh embodiment as well, as is substantially similar to the second embodiment, there are formed an insulating substrate 11, an electrically conductive layer 12, a drift layer 6, and a surface electrode 7. The structure and functions of these elements are similar to those of the electron source 10 according to the second embodiment. A description thereof is omitted here.

In the electron source 10 according to the seventh embodiment as well, electrons are emitted in the mechanism and model similar to a case of the second embodiment.

In the case where the electron source 10 according to the seventh embodiment is utilized as an electron source of a display, the lower electrode and surface electrode 7 or the like may be properly patterned.

Hereinafter, a method of manufacturing the electron source 10 according to the seventh embodiment will be described with reference to FIG. 12A to FIG. 12D.

First, on one surface of the insulating substrate 11, an electrically conductive layer 12 consisting of a metal film (for example, tungsten film) is formed in accordance with a sputtering technique, and an electrically conductive substrate is fabricated. Then, on a main surface of the electrically conductive substrate (on the electrically conductive layer 12), a non-doped polycrystalline silicon layer 3 is formed as a semiconductor layer, and a structure shown in FIG. 12A is obtained. As a method of film forming the polycrystalline silicon layer 3, for example, there is employed a CVD technique, a sputtering technique, or a CGS technique.

After the non-doped polycrystalline silicon layer 3 has been formed, the polycrystalline silicon layer 3 is made porous in the anodic oxidation process step. In this manner, the process polycrystalline silicon layer 4 that is a porous semiconductor layer is formed, and a structure shown in FIG. 12B is obtained. In the anodic oxidation processing step, there is employed an anodic oxidation processing vessel containing an electrolytic solution that consists of a mixture liquid obtained by mixing 55 wt % hydrogen fluoride water solution and ethanol by substantially 1:1. With a platinum electrode (not shown) being a negative polarity and an electrically conductive layer 12 being a positive polarity, while light emission is carried out for the polycrystalline silicon layer 3, anodic oxidation processing is carried out at a constant current, whereby a porous polycrystalline silicon layer 4 is formed. The thus formed porous polycrystalline silicon layer 4 has grains and silicon nanocrystals that are sources of the grain 51 and silicon nanocrystal 63 respectively. In the seventh embodiment, although all of the polycrystalline silicon layer 3 is made porous, only a part of the layer may be made porous.

After the anodic oxidation processing step has terminated, the rinse step is carried out as is the case of the sixth embodiment. Then, the porous polycrystalline silicon layer 4 is oxidized in the oxidizing step that is the insulating film forming step, and the drift layer 6 consisting of the oxidized porous polycrystalline silicon layer is formed, and a structure shown in FIG. 12C is obtained.

In the oxidizing step, an oxidization processing vessel containing an electrolytic solution (such as diluted sulfuric acid, diluted nitric acid, aqua regia, for example) is employed. Then, with a platinum electrode (not shown) being a negative polarity and an electrically conductive layer 12 being a positive polarity, a constant current is supplied, and the porous polycrystalline silicon layer 4 is oxidized, whereby there is formed the drift layer 6 containing the grain 51, silicon nanocrystal 63, and silicon oxide films 52 and 64.

After the drift layer 6 has been formed, the surface electrode 7 consisting of a metal thin film is formed on the drift layer 6, and an electron source 10 shown in FIG. 12D is obtained. In the seventh embodiment, the surface electrode 7 is formed in accordance with the electron beam vapor deposition technique. However, a method of forming the surface electrode 7 is not limited to the electron beam vapor deposition technique, for example, a sputtering technique may be employed.

In this manner, in the method of manufacturing the electron source 10 according to the seventh embodiment 7 as well, as is the case of the sixth embodiment, the step of forming the drift layer 6 includes the anodic oxidation processing step, rinse step, and insulating film forming step. Thus, an electrolytic solution or the like that remains in the porous polycrystalline silicon layer 4 formed in the anodic oxidation processing step can be reduced before the insulating film forming step. In addition, the quality of the insulating film (silicon oxide films 52 and 64) formed on the surface of a respective one of the grain 51 and silicon nanocrystal 63 can be improved in the insulating film forming step. Thus, the dielectric strength of the electron source 10 can be improved and the service life can be extended as compared with the prior art.

In the sixth and seventh embodiments, the drift layer 6 is composed of an oxidized porous polycrystalline silicon layer. However, this layer may be composed of the other oxidized porous semiconductor layer or the nitride or oxi-nitride porous semiconductor layer. That is, in the sixth and seventh embodiments, although an insulating film formed in the insulating film forming step is a silicon oxide film, the insulating film may be composed of an oxide film other than silicon oxide film, a nitride film such as silicon nitride film, or an oxi-nitride film such as silicon oxi-nitride film. The silicon nitride film or silicon oxi-nitride film is employed, whereby the dielectric strength voltage can be improved as compared with a case of the silicon oxide film. The silicon nitride film or silicon oxi-nitride film and the like may be formed in accordance with rapid thermal oxidization.

In the sixth and seventh embodiment, gold is employed as a material for the surface electrode 7. However, aluminum, chrome, tungsten, nickel, or platinum may be employed. In addition, the surface electrode 7 may be composed of at least a two-layered thin film layer deposited in the thickness direction. In the case where the surface electrode 7 is composed of a two-layered thin film layer, for example, gold or the like is employed as a material for an upper thin film layer. In addition, chrome, nickel, platinum, titanium, or indium, for example, is employed as a material for a lower thin film layer (thin film layer at the drift layer 6 side)

Eighth Embodiment

Hereinafter, an eighth embodiment of the present embodiment will be described. An electron source and a method of manufacturing the electron source according to the eighth embodiment are identical to those according to the first embodiment in basic configuration and functions. The eighth embodiment will be described with reference to FIG. 2A to FIG. 2D and FIG. 3 and FIG. 4.

In the eighth embodiment, as in the first embodiment, as an electrically conductive substrate, there is employed a single-crystalline n-type silicon substrate whose resistivity is comparatively dose to that of a conductor (for example, a (100) substrate whose resistivity is substantially 0.01 Ω cm to 0.02 Ω cm).

As shown in FIG. 3, in the electron source 10 according to the eighth embodiment as well, as in the first embodiment, there are formed an n-type silicon substrate 1, an ohmic electrode 2, a drift layer 6, and a surface electrode 7. A structure and functions of these elements are similar to those of the electron source 10 according to the first embodiment. A description thereof is omitted here.

In addition, as shown in FIG. 4, in the electron source 10 according to the eighth embodiment as well, electrons are emitted in the mechanism and model similar to a case of the first embodiment.

Hereinafter, a method of manufacturing the electron source 10 according to the eighth embodiment will be described with reference to FIG. 2A to FIG. 2D.

First, an ohmic electrode 2 is formed on a back face of the n-type silicon substrate 1. Then, on the main surface of the n-type silicon substrate, a non-doped polycrystalline silicon layer 3 is formed as a semiconductor layer, and a structure shown in FIG. 2A is obtained. As a method of film forming the polycrystalline silicon layer 3, for example, there is employed a CVD technique, a sputtering technique, or a CGS technique and the like.

After the non-doped polycrystalline silicon layer 3 has been formed, the polycrystalline silicon layer 3 is made porous in the anodic oxidation processing step. In this manner, the porous polycrystalline silicon layer 4 that is a porous semiconductor layer is formed, and a structure shown in FIG. 2B is obtained In the anodic oxidation processing step, there is employed an anodic oxidation processing vessel containing an electrolytic solution that consists of a mixture liquid obtained by mixing 55 wt. % of hydrogen fluoride water solution and ethanol by substantially 1:1. Then, with a platinum electrode (not shown) being a negative polarity and the n-type silicon substrate 1 (ohmic electrode 2) being a positive polarity, while light emission is carried out for the polycrystalline silicon layer 3, anodic oxidation is carried out at a constant current. In this manner, a porous polycrystalline silicon layer 4 is formed. The thus formed porous polycrystalline silicon layer 4 has grains and silicon nanocrystals that are sources of the grain 51 and silicon nanocrystal 63, respectively. In the sixth embodiment, although all of the polycrystalline silicon layer 3 is made porous, only a part of the layer may be made porous.

In the oxidizing step, an oxidization processing vessel containing an electrolytic solution (such as diluted sulfuric acid, diluted nitric acid, aqua regia, for example) is employed. Then, with a platinum electrode (not shown) being a negative polarity and an n-type silicon substrate 1 (an ohmic electrode 2) being a positive polarity, a constant current is supplied, and the porous polycrystalline silicon layer 4 is oxidized, whereby there is formed the drift layer 6 containing the grain 51, silicon nanocrystal 63, and silicon oxide films 52 and 64.

In the manufacturing method according to the eighth embodiment, during a specified period between the anodic oxidation processing step and the oxidizing step, a natural oxide film is prevented from being formed on the surface of a silicon nanocrystal that is a semiconductor nanocrystal so as not to expose the porous polycrystalline silicon layer 4 to the air. In the eighth embodiment, in order to prevent the natural oxide film from being formed in the specified period, the polycrystalline silicon layer 3 is made porous in the anodic oxidation processing step, and then, rinsing is carried out by employing alcohol (such as ethanol, isopropyl alcohol, or methyl alcohol, for example). After rinsing, the porous polycrystalline silicon layer 4 is immersed in electrolytic solution of the oxidization processing vessel immediately while its surface is covered with alcohol. Therefore, a natural oxide film can be prevented from being formed on the porous polycrystalline silicon layer 4, and contamination can be restricted.

In the eighth embodiment, alcohol configures non-oxide liquid. As means for preventing the porous polycrystalline silicon layer 4 from being exposed to the air during the specified period, inert gas may be employed as the atmosphere during the specified period. Alternatively, at least the porous polycrystalline silicon layer 4 may be maintained in vacuum during the specified period. Inert gas is employed as the atmosphere during the specified period, whereby a natural oxide film can be prevented from being formed, and contamination of the porous polycrystalline silicon layer 4 can be restricted. In addition, if the porous polycrystalline silicon layer 4 is maintained in vacuum, a natural oxide film can be prevented from being formed, and the impurities can be restricted from adhering to the porous polycrystalline silicon layer 4.

After the drift layer 6 has been formed, a surface electrode 7 consisting of a metal thin film is formed on the drift layer 6, and an electron source 10 shown in FIG. 2D is obtained. In the eighth embodiment, the surface electrode 7 is formed in accordance with the electron beam vapor deposition technique. However, a method of forming the surface electrode 7 is not limited to the electron beam vapor deposition technique, and a sputtering technique may be employed, for example.

In this manner, in the method of manufacturing the electron source 10 according to the eighth embodiment, the step of forming the drift layer 6 includes: the anodic oxidation processing step of forming the porous polycrystalline silicon layer 4 in accordance with anodic oxidation; and the oxidizing step of oxidizing the porous polycrystalline silicon layer 4, thereby forming the silicon oxide films 52 and 64 respectively on the surfaces of the grain 51 and silicon nanocrystals 63. Then, during a specified period between the anodic oxidation processing step and oxidizing step, a natural oxide film is prevented from being formed on the surface of the silicon nanocrystal 63 so as not to expose the porous polycrystalline silicon layer 4 to the air. Thus, during the specified period between the anodic oxidation processing step and oxidizing step, a natural oxide film can be prevented from being formed on the surface of the silicon nanocrystal 63. As a result, the quality of the silicon oxide film formed on the surface of the silicon nanocrystal can be improved in the oxidizing step. In this manner, the dielectric strength of the electron source 10 can be improved, and the service life can be extended.

In the electron source 10 manufactured in accordance with the manufacturing method according to the eighth embodiment, the electron emission efficiency is improved as compared with an electron source 10' manufactured in accordance with a conventional manufacturing method. A reason of such improvement is as follows. That is, a natural oxide film is prevented from being formed. Thus, a deviation of film thickness of a respective one of the silicon oxide films 52 and 64 in the drift layer 6, the defect density of the silicon oxide films 52 and 64, or the defect density of a critical surface between the silicon oxide film 64 and the silicon nanocrystal 63 and the like is reduced as compared with a conventional drift layer 6'. Thus, the scattering probability of the silicon oxide film 64 can be reduced more remarkably than the prior art, and a loss due to scattering is reduced.

Ninth Embodiment

Hereinafter, a ninth embodiment of the present invention will be described. An electron source and a method of manufacturing the electron source according to the ninth embodiment is identical to those according to the second embodiment in basic configuration and functions. The ninth embodiment will be described with reference to FIG. 11 and FIG. 12A to FIG. 12D. The electron source and the method of manufacturing it according to the ninth embodiment has a plenty of common points to those according to the eighth embodiment.

In the ninth embodiment, as an electrically conductive substrate, there is employed a substrate on which an electrically conductive layer consisting of a metal film (for example, tungsten film) is provided on one surface of an insulating substrate consisting of a glass substrate. In the case where the substrate on which an electrically conductive layer is formed on one surface of the insulating substrate is thus employed, a larger area and cost reduction of the electron source are made possible as compared with a case in which the semiconductor substrate is employed as an electrically conductive substrate as in the eighth embodiment.

As shown in FIG. 11, in the electron source 10 according to the ninth embodiment, as is substantially similar to the second embodiment, there are an insulating substrate 11, an electrically conductive layer 12, a drift layer 6, and a surface electrode 7. A structure and functions of these elements are similar to those of the electron source 10 according to the second embodiment. A description thereof is omitted here.

In the electron source 10 according to the ninth embodiment as well, electrons are emitted in the mechanism and model similar to a case of the second embodiment.

In the case where the electron source 10 according to the ninth embodiment is utilized as an electron source of a display, the lower electrode or surface electrode 7 and the like may be properly patterned.

Hereinafter, a method of manufacturing the electron source 10 according to the ninth embodiment will be described with reference to FIG. 12A to FIG. 12D.

First, on one surface of an insulating substrate 11, an electrically conductive layer 12 consisting of a metal film (for example, tungsten film) is formed in accordance with a sputtering technique, and an electrically conductive substrate is fabricated. Then, on a main surface of an electrically conductive substrate (on the electrically conductive layer 12), a non-doped polycrystalline silicon layer 3 is formed as a semiconductor layer, and a structure shown in FIG. 12A is obtained. As a method of film forming a polycrystalline silicon layer 3, for example, there is employed a CVD technique, a sputtering technique, or a CGS technique or the like.

After the non-doped polycrystalline silicon layer 3 has been formed, the polycrystalline silicon layer 3 is made porous in the anodic oxidation processing step. In this manner, a porous polycrystalline silicon layer 4 that is a porous semiconductor layer is formed, and a structure shown in FIG. 12B is obtained. In the anodic oxidation processing step, there is employed an anodic oxidation processing vessel containing an electrolytic solution that consists of a mixture liquid obtained by mixing 55 wt % of hydrogen fluoride water solution and ethanol by substantially 1:1. With a platinum electrode (not shown) being a negative polarity and an electrically conductive layer 12 being a positive polarity, while light emission is carried out for the polycrystalline silicon layer 3, anodic oxidation processing is carried out at a constant current, whereby a porous polycrystalline silicon layer 4 is formed. The thus formed porous polycrystalline silicon layer 4 has grains and silicon nanocrystals that are sources of a respective one of the grain 51 and silicon nanocrystal 63. In the ninth embodiment, although all of the polycrystalline silicon layer 3 is made porous, only a part of the layer may be made porous.

After the anodic oxidation processing step has terminated, the porous polycrystalline silicon layer 4 is oxidized in the oxidizing step. In this manner, the drift layer 6 consisting of the oxidized porous polycrystalline silicon layer is formed, and a structure shown in FIG. 12C is obtained.

In the oxidizing step, an oxidization processing vessel containing an electrolytic solution (such as diluted sulfuric acid, diluted nitric acid, or aqua regia, for example) is employed. Then, with a platinum electrode (not shown) being a negative polarity and an electrically conductive layer 12 being a positive polarity, a constant current is supplied, and the porous polycrystalline silicon layer 4 is oxidized, whereby a drift layer 6 containing the grain 51, silicon nanocrystal 63, and silicon oxide films 52 and 64 are formed. In the manufacturing method according to the ninth embodiment, as is the case of the eighth embodiment, a natural oxide film is prevented from being formed on the surface of a silicon nanocrystal that is a semiconductor nanocrystal so as not to expose the porous polycrystalline silicon layer 4 that is a porous semiconductor layer to the air during a specified period between the anodic oxidation processing step and the oxidization step.

After the drift layer 6 has been formed, a surface electrode 7 consisting of a metal film is formed on the drift layer 6, and an electron source 10 shown in FIG. 12D is obtained. In the ninth embodiment, the surface electrode 7 is formed in accordance with the electron beam vapor deposition technique. However, a method of forming the surface electrode 7 is not limited to the electron beam vapor deposition technique, and a sputtering technique may be employed, for example.

In this manner, in the method of manufacturing the electron source 10 according to the ninth embodiment, the step of forming the drift layer 6 includes: the anodic oxidation processing step of forming the porous polycrystalline silicon layer 4 by anodic oxidation processing and the oxidizing step of oxidizing the porous polycrystalline silicon layer 4, thereby forming the silicon oxide films 52 and 64 respectively on the surfaces of the grain 51 and silicon nanocrystal 63. Then, during the specified period between the anodic oxidation processing step and oxidizing step, a natural oxide film is prevented from being formed on the surface of the silicon nanocrystal 63 so as not to expose the porous polycrystalline silicon layer 4 to the air. Thus, during the specified period between the anodic oxidation processing step and oxidizing step, a natural oxide film is prevented from being formed on the surface of the silicon nanocrystal 63. In addition, the quality of the, silicon oxide Elm formed on the surface of the silicon nanocrystal in the oxidizing step can be improved. As a result, the dielectric strength of the electron source 10 can be improved and the service life can be extended as compared with the prior art.

In addition, in the electron source 10 manufactured in accordance with the manufacturing method according to the ninth embodiment, the electron emission efficiency is improved as compared with an electron source 10' manufactured in accordance with a conventional manufacturing method. The cause of such improvement is similar to the case of the eighth embodiment.

In the eighth and ninth embodiments, although the drift layer 6 is composed of an oxidized porous polycrystalline silicon layer, this layer may be composed of the other oxidized porous semiconductor layer.

In the eighth and ninth embodiments, gold is employed as a material for the surface electrode 7. However, the material for the surface electrode 7 is not limited to gold, and aluminum, chrome, tungsten, nickel, or platinum and the like may be employed, for example. In addition, the surface electrode 7 may be composed of at least a two-layered thin film layer deposited in the thickness direction. In the case where the surface electrode 7 is composed of the two-layered thin film layer, gold is employed as a material for the upper thin film layer, for example. In addition, chrome, nickel, platinum, titanium, or indium and the like is employed as a material for the lower thin film layer (thin film layer on the drift layer 6 side).

Tenth Embodiment

Hereinafter, a tenth embodiment of the present invention will be described. An electron source and a method of manufacturing the electron source according to the tenth embodiment are identical to those according to the first embodiment in basic configuration and functions. The tenth embodiment will be described with reference to FIG. 2A to FIG. 2D, FIG. 3, and FIG. 4.

In the tenth embodiment, as in the first embodiment, as an electrically conductive substrate, there is employed a single-crystalline n-type silicon substrate whose resistivity is comparatively close to that of a conductor (for example, a (100) substrate whose resistivity is substantially 0.01 Ω cm to 0.02 Ω cm).

As shown in FIG. 3, in the electron source 10 according to the tenth embodiment as well, as in the first embodiment, there are formed an n-type silicon substrate 1, an ohmic electrode 2, a drift layer 6, and a surface electrode 7. A structure and functions of these elements are similar to those of the electron source 10 according to the first embodiment. A description thereof is omitted here.

In addition, as shown in FIG. 4, in the electron source 10 according to the tenth embodiment as well, electrons are emitted in the mechanism and model similar to a case of the first embodiment.

Hereinafter, a method of manufacturing the electron source 10 according to the tenth embodiment will be described with reference to FIG. 2A to FIG. 2D.

First, an ohmic electrode 2 is formed on the back face of the n-type silicon substrate 1. Then, on the main surface of the n-type silicon substrate 1, a non-doped polycrystalline silicon layer 3 of predetermined film thickness (for example, 1.5 μm) is formed in accordance with an LPCVD technique, for example, and a structure shown in FIG. 2A is obtained. A condition for film forming the polycrystalline silicon layer 3 is as follows. The degree of vacuum is 20 Pa. The substrate temperature is 640° C. The flow rate of mono-silane gas is 0.6 L/min (600 sccm) in a standard state. As a method of film forming the polycrystalline silicon layer 3, for example, there is employed a CVD technique, a sputtering technique, or a CGS technique and the like.

After the non-doped polycrystalline silicon layer 3 has been formed, the polycrystalline silicon layer 3 is made porous in the anodic oxidation processing step In this manner, a porous polycrystalline silicon layer 4 that is a porous semiconductor layer is formed, and a structure shown in FIG. 2B is obtained In the anodic oxidation processing step, there is employed a processing vessel containing an electrolytic solution that consists of a mixture liquid obtained by mixing 55 wt % of hydrogen fluoride water solution and ethanol by substantially 1:1. Then, with a platinum electrode (not shown) being a negative polarity and with a lower electrode consisting of the n-type silicon substrate 1 and ohmic electrode 2 being a positive polarity, while light emission is carried out for the polycrystalline silicon layer 3, anodic oxidation processing is carried out at a constant current, whereby a porous polycrystalline silicon layer 4 is formed. The thus formed porous polycrystalline silicon layer 4 contains polycrystalline silicon grains and silicon nanocrystals. In the tenth embodiment, a condition for anodic oxidation processing is as follows. The current density is 30 mA/cm$^2$, which is constant. The anodic oxidation time is 10 seconds. During anodic oxidation processing, light emission is carried out on the surface of the polycrystalline silicon layer 3 by means of a 500 W lamp.

After the anodic oxidation processing step has terminated, the porous polycrystalline silicon layer 4 is oxidized in the oxidizing step. In this manner, the drift layer 6 consisting of the oxidized porous polycrystalline silicon layer is formed, and a structure shown in FIG. 2C is obtained.

In the oxidization step, for example, there is employed a processing vessel containing an electrolytic solution obtained by dissolving 0.04 mol/1 (hereinafter, "mol/1" is referred to as "M") of potassium nitrate (solute) in ethylene glycol (organic solvent). Then, with a platinum electrode (not shown) being a negative polarity (cathode) and a lower electrode consisting of the n-type silicon substrate 1 and ohmic electrode 2 being a positive polarity (anode), a constant current is supplied, and the porous polycrystalline silicon layer 4 is electrochemically oxidized, whereby the drift layer 6 containing the grain 51, silicon nanocrystal 63, and silicon oxide films 52 and 64 are formed. That is, in the tenth embodiment, the porous polycrystalline silicon layer 4 is electrochemically oxidized by employing an electrolytic solution which does not contain water.

In the oxidizing step of the tenth embodiment, a constant current of 0.1 mA/cm$^2$ is supplied until a voltage between the positive polarity and the negative polarity rises to 20 V, whereby the porous polycrystalline silicon layer 4 is oxidized. However, this condition may be changed as required. For example, after oxidization has been carried out at a constant current until the voltage between the positive electrode and negative electrode rises to a predetermined voltage (for example, 20 V), the voltage between the positive electrode and negative electrode is maintained at the above predetermined voltage. Then, when a chemically synthetic current density decreases to a predetermined value (for example, 0.01 mA/cm$^2$), power supply may be stopped. By doing this, in the drift layer 6, the fineness of the silicon oxide films 52 and 64 in a region close to the n-type silicon substrate 1 can be improved.

After the drift layer 6 has been formed, the surface electrode 7 consisting of a metal film is formed on the drift layer 6 in accordance with a vapor deposition technique, for example, and an electron source 10 shown in FIG. 2D is obtained.

According to the method of manufacturing the above electron source 10, when the drift layer 6 is formed, the porous polycrystalline silicon layer 4 that is a porous semiconductor layer is electrochemically oxidized in an electrolytic solution obtained by dissolving a solute in organic solvent (main oxidization processing process). Thus, an emission current or electron emission efficiency and the like is improved, and the stability with an elapse of time is improved for electron emission characteristics of the electron source 10. (Therefore, the service life of the electron source 10 can be extended). The electron emission characteristics are improved and the stability with an elapse of time is improved as compared with the prior art because no water exists in an electrolytic solution employed in the oxidization step, and the fineness of the silicon oxide films 52 and 64 is increased, whereby the dielectric strength of the silicon oxide films 52 and 64 is improved. In addition, the electron emission efficiency is improved as compared with the prior art. This is because an energy loss due to electron scattering in the silicon oxide film 52 in the drift layer 6 is reduced.

In addition, the porous polycrystalline silicon layer 4 is rapidly thermally oxidized in the oxidizing step, whereby the process temperature can be reduced as compared with a process for forming the drift layer, and a larger area and cost reduction can be easily achieved. Namely, due to the lowered process temperature, a restriction on the substrate material is reduced. This makes it possible to employ a large area, inexpensive glass substrate (such as no-alkali glass substrate, low alkali glass substrate, or soda lime glass substrate, for example). In the case where such a glass substrate is employed, the lower electrode consisting of the electrically conductive material may be formed on one surface of the glass substrate.

In the electron source 10 manufactured in accordance with the above described manufacturing method, the drift layer 6 is formed in accordance with a process containing the oxidizing step of electrochemically oxidizing the porous polycrystalline silicon layer 4 that is a porous semiconductor layer in an electrolyte solution obtained by dissolving a solute in an organic solvent. Thus, unlike the prior art, the emission current or electron emission efficiency and the like can be improved as compared with the electron source in which the drift layer is formed by electrochemically oxidizing the porous polycrystalline silicon layer in the electrolytic solution consisting of water solution such as sulfuric acid or nitric acid. Further, the stability with an elapse of time can be improved for electron emission characteristics.

The organic solvents for electrolytic solution employed in the above described oxidizing step is not limited to ethylene glycol. For example, there may be employed one or two kinds of mixture liquids of organic solvents such as ethylene glycol, methanol, ethanol, propanol, butanol, diethylene glycol, methoxy ethanol, glycerin, polyethylene glycol, dimethyl formaldehyde, propylene glycol, cellosorve, butyl lactone, valero lactone, ethylene carbonate, propylene carbonate, methyl formaldehyde, ethyl formaldehyde, diethyl formaddehyde, methyl acetoamide, dimetyl acetoamide, tetrahydroflufuryl alcohol. The solute of the electrolytic solution is not limited to potassium nitrate. There may be employed a mixture of one or two kinds of acids such as hydroxide, chloride, carbonic acid, sulfuric acid, nitric acid, phosphoric acid, chromic acid, tartaric acid, hydrochloric acid, bromic acid, malonic acid, adipic acid, caprylic acid, palarconic acid, palmitinic acid, oleic acid, walitilic acid, phthalic acid, benzoic acid, resorcinic acid, cumilic acid, citric acid, malic acid, succinic acid, pimelic acid, suberic acid, azelaic acid, sebasic acid, maleic acid, fumaric acid, citraconic acid, boronic acid, tungstic acid, molybdic acid, or vanadic acid. In addition, there may be employed a mixture of one or two kinds of salts such as carbonic acid salt, sulfuric acid salt, nitric acid salt, phosphoric acid salt, chromic acid salt, tartaric acid salt, hydrochloric acid salt, bromic acid salt, malonic acid salt, adipinic acid salt, caprylic acid salt, pelargonic acid salt, palmitinic acid, oleic acid salt, walitilic acid salt, phthalic acid salt, benzoic acid salt, resorcinic acid salt, cumiric acid salt, citric acid salt, malic acid salt, succinic acid salt, pimelic acid salt, suberic acid salt, azelaic acid salt, sebasic acid salt, maleic acid salt, fumaric acid salt, citraconic acid salt, boronic acid salt, tungstic acid salt, molybdic acid salt, or vanadic acid salt. As a salt, there may be employed a mixture of one or two kinds of salts such as sodium hydroxide, potassium hydride, lithium hydride, calcium hydride, sodium chloride, potassium chloride, magnesium chloride, aluminum chloride, sodium sulfate, magnesium sulfate, lithium nitrate, potassium nitrate, sodium nitrate, calcium nitrate, or ammonium tartrate.

In the meantime, as in the tenth embodiment, in the case where the porous polycrystalline silicon layer 4 is electrochemically oxidized by employing an electrolytic solution containing an alkali metal such as potassium nitrate in the main oxidization processing process, there is a danger that impurities such as alkali metal be mixed in the porous polycrystalline silicon layer 4. Thus, it is desirable that the wash process for washing the porous polycrystalline silicon layer 4 be carried out. By carrying out such wash process, even if impurities such as alkali metal or heavy metal are mixed in the porous polycrystalline silicon layer 4, the impurity can be removed in the wash process. As a result, the electron emission characteristics of the electron source 10 can be stabilized, and the long term reliability can be improved.

In the wash process, for example, a mixture liquid of sulfuric acid and hydrogen peroxide, a mixture liquid of a hydrochloric acid and hydrogen peroxide, or aqua regia and the like may be employed as a mixture. By employing any wash liquid of these mixtures, the wash liquid employed in the wash process can be obtained with comparatively low cost. As a result, the manufacturing cost of the electron source 10 can be reduced.

Eleventh Embodiment

Hereinafter, an eleventh embodiment of the present invention will be described. A basic configuration of the eleventh embodiment is common to that of the tenth embodiment. In order to avoid a duplicate description, a differences from the tenth embodiment will be described primarily.

A method of manufacturing an electron source 10 according to the eleventh embodiment includes an auxiliary oxidization processing process for carrying out rapid thermal oxidization for a comparatively short time in accordance with a rapid heating technique (thermal oxidization technique) employing a lamp annealing device before a main oxidization processing process for oxidizing the porous polycrystalline silicon layer 4 formed in accordance with the anodic oxidation processing by utilizing an electrolytic solution. This is only one difference from the tenth embodiment. A condition for rapidly thermally oxidizing the porous polycrystalline silicon layer 4 in accordance with the rapid heating technique is as follows. The flow rate of oxygen gas is 0.3 L/min (300 sccm) in a standard state. The oxidization temperature is 900° C., and the oxidization time is 5 minutes. The oxidization time when the drift layer is formed only in accordance with the rapid thermal oxidization is comparatively long, which is about 1 hour.

In the electron source 10 manufactured in accordance with the manufacturing method according to the eleventh embodiment, the stability with an elapse of time of electron emission characteristics is improved more remarkably as compared with a case of the tenth embodiment. This is because the fineness of the silicon oxide films 52 and 64 is improved more remarkably as compared with that of the tenth embodiment.

In the eleventh embodiment, although the auxiliary oxidization processing process is carried out before the main oxidization processing process, the former may be carried out after the latter.

Twelfth Embodiment

Hereinafter, a twelfth embodiment of the present invention will be described. The basic configuration of the twelfth embodiment is common to that of the tenth embodiment. In order to avoid a duplicate description, a difference from the tenth embodiment will be primarily described below.

In an electron source 10 according to the tenth embodiment, a drift layer 6 is formed by electrochemically oxidizing a porous polycrystalline silicon layer 4 formed in accordance with anodic oxidation processing by utilizing an electrolytic solution. However, in the anodic oxidation processing, a mixture liquid between a hydrogen fluoride water solution and ethanol is utilized, and thus, the surface of the silicon nanocrystals in the porous polycrystalline silicon layer 4 is terminated by hydrogen. Thus, there is a danger that the content of hydrogen in the drift layer 6 is comparatively large in amount.

In contrast, in the twelfth embodiment, the porous polycrystalline silicon layer 4 is oxidized by an oxide solution before the main oxidization processing process in which the porous polycrystalline silicon layer 4 formed in accordance with the anodic oxidation processing is electrochemically oxidized by employing an electrolytic solution (pre-oxidization processing process). That is, in the twelfth embodiment, before the main oxidization processing process, the silicon nanocrystals and grains is immersed in an oxide solution by an time interval to an extent such that the surface is oxidized, and the hydrogen atom terminating a silicon atom is replaced with an oxygen atom.

A processing condition in the pre-oxidization processing process is as follows. As an oxide solution, there is employed a nitric acid heated at 115° C. (70% in concentration). The oxidization time is 10 minutes. When the oxide solution is heated, the oxidization velocity increases, thus making it possible to reduce the processing time when the oxide solution is used. As an oxide solution, there can be employed one or more than one kinds of oxidizing agent selected from the group consisting of nitric acid, sulfuric acid, hydrochloric acid, or hydrogen peroxide water.

In the electron source 10 manufactured in accordance with the manufacturing method according to the twelfth embodiment, the stability with an elapse of time is improved more remarkably for the electron emission characteristics as compared with a case of the tenth embodiment. This is because the content of hydrogen in the silicon oxide films 52 and 64 is low as compared with the tenth embodiment, and the fineness of the silicon oxide films 52 and 64 is improved more remarkably. The porous polycrystalline silicon layer 4 formed in accordance with anodic oxidation processing has a fine structure of nanometer order. Thus, in the case where the main oxidization processing process for electrochemically oxidizing the porous polycrystalline silicon layer 4 by utilizing an electrolytic solution is carried out, a new electrolytic solution is supplied to the surface of the porous polycrystalline silicon layer 4. On the other hand, in the thickness direction of the porous polycrystalline silicon layer 4, an electrolytic solution hardly invades into a region that is comparatively distant from the surface, and replacement of the electrolytic solution hardly occurs. Thus, in the thickness direction of the porous polycrystalline silicon layer 4, the film thickness of the silicon oxide film 64 is large in a region that is comparatively close to the surface, while the film thickness of the silicon oxide film 64 is small in a region that is comparatively distant from the surface. As a result, in the region that is comparatively close to the surface electrode 7 in the thickness direction of the drift layer 6, the film thickness of the silicon oxide film 64 is so large that electron scattering is likely to occur. In this manner, the electron emission efficiency is lowered. On the other hand, in the region which is comparatively distant from the surface electrode 7 in the thickness direction of the drift layer 6, the film thickness of the silicon oxide film 64 is so small that the dielectric solution is lowered, and the characteristics with an elapse of time is impaired.

In contrast, in the twelfth embodiment, the pre-oxidization processing process is carried out before the main oxidization processing process for electrochemically oxidizing the porous polycrystalline silicon layer 4. (Namely, the main oxidization processing process is carried out after the pre-oxidization processing process). Thus, before starting the main oxidization processing process, the surface side of the porous polycrystalline silicon layer 4 is already oxidized. Therefore, in the main oxidization processing process, in the thickness direction of the porous polycrystalline silicon layer 4, a current hardly flows in the region that is comparatively close to the surface, and oxidization reaction does not proceed. On the other hand, oxidization proceeds in the region that is comparatively distant from the surface. Thus, the film thickness of the silicon oxide films 52 and 64 that exist in the region comparatively close to the surface electrode 7 in the thickness direction of the drift layer 6 can be restricted from being larger than that of the silicon oxide films 52 and 64 that exist in the region comparatively distant from the surface electrode 7. In short, a deviation of the film thickness of a number of silicon oxide films 64 can be reduced. As a result, electron scattering in the drift layer 6 is restricted, and the dielectric strength is restricted from being lowered.

In the twelfth embodiment, oxidization of the porous polycrystalline silicon layer 4 is carried out by employing an oxide solution in the pre-oxidization processing process. However, in the pre-oxidization processing process, the porous polycrystalline silicon layer may be oxidized by employing oxide gas such as oxygen or ozone, for example, instead of oxide solution. In addition, oxidization may be carried out by merely exposing the surface of the porous polycrystalline silicon layer 4 to the air. However, in this case, there is a possibility that the film quality of an oxide film to be formed is impaired. Therefore, it is preferable that annealing processing be carried out as is the case of a fourteenth embodiment described later.

In addition, in the case where the auxiliary oxidization processing process is carried out before the main oxidization processing process as is the case of the eleventh embodiment, the pre-oxidization processing process is carried out before the auxiliary oxidization processing process, whereby the stability with an elapse of time can be improved more remarkably for the electron emission characteristics.

Thirteenth Embodiment

Hereinafter, a thirteenth embodiment of the present invention will be described. The basic configuration of the thirteenth embodiment 13 is common to that of the tenth embodiment. In order to avoid a duplicate description, a difference from the tenth embodiment will be primarily described below.

In the thirteenth embodiment, a method of manufacturing the electron source 10 according to the tenth embodiment is characterized in that water is added to an electrolytic solution employed in the main oxidization processing process for electrochemically oxidizing the porous polycrystalline silicon layer 4. In the thirteenth embodiment, ethylene glycol is employed as an organic solvent in an electrolytic solution, and 0.04 M of potassium nitrate is employed as a solute. 6 wt % of water is contained in the electrolytic solution.

According to the thirteenth embodiment, as is the case of the tenth embodiment, the emission current and electron emission efficiency can be improved as compared with a conventional electron source in which a porous polycrystalline silicon layer is electrochemically oxidized in an electrolytic solution consisting of a water solution such as sulfuric acid or nitric acid, whereby the drift layer is formed, and the stability with an elapse of time can be improved for the electron emission characteristics.

In addition, water is added to the electrolytic solution. Thus, in the case where a substance with its solubility to an organic solvent and with its solubility to water is employed as a solute, the concentration of the solute in the electrolytic solution can be increased by adding water. Therefore, the film quality of the silicon oxide films 52 and 64 is improved. In addition, when the concentration of the solute increases, the electrical conductivity of the electrolytic solution increases. Therefore, the in-plane deviation in film thickness of the oxide films 52 and 64 can be restricted.

As an organic solvent and solute, there can be employed those exemplified in the tenth embodiment. In addition, it is preferable that the rate of water contained in the electrolytic solution is 10 wt % or less. However, even if the above rate is 20 wt %, the emission current and electron emission efficiency can be improved as compared with the prior art. Even if the rate is 50 wt %, the emission current and electron emission efficiency can be improved as compared with the prior art.

Fourteenth Embodiment

Hereinafter, a fourteenth embodiment of the present invention will be described. The basic configuration of the fourteenth embodiment is common to that of the tenth embodiment. In order to avoid a duplicate description, a difference from the tenth embodiment will be primarily described below.

In the case where the silicon oxide films 52 and 64 are exposed to the air after the main oxidization processing process, there is a danger that the solute thereof is impaired. The fourteenth embodiment includes an annealing processing process for carrying out annealing processing after the main oxidization processing process for electrochemically oxidizing the porous polycrystalline silicon layer 4 by utilizing an electrolytic solution in the tenth embodiment. This is only one difference from the tenth embodiment.

Annealing processing is carried out by maintaining a predetermined annealing temperature (for example, 500° C.) in the oxygen gas atmosphere (namely, atmosphere containing oxide specie) by a predetermined annealing time (for example, 1 hour). It is desirable that the annealing temperature be set to 600° C. or less. By setting the annealing temperature to 600° C. or less, for example, in the case of forming a lower electrode on a glass substrate, a glass substrate with its low heat resistance temperature and with a modest price can be employed as a glass substrate. Thus, the cost of the electron source 10 can be reduced, and the annealing time can be comparatively increased. As a result, the fineness of the silicon oxide films 52 and 64 is improved.

In the electron source 10 manufactured in accordance with the manufacturing method according to the fourteenth embodiment, the emission current and electron emission efficiency are improved as compared with the electron source 10 manufactured in accordance with the manufacturing method according to the tenth embodiment. This is because the fineness of the silicon oxide films 52 and 64 is improved more remarkably as compared with that of the tenth embodiment. As has been described previously, annealing processing is carried out in atmosphere containing oxide specie, thereby making it possible to prevent impurities from being introduced into the silicon oxide films 52 and 64.

Annealing processing may be carried out in a vacuum or inert gas atmosphere. Annealing processing is carried out in inert gas atmosphere, thereby making it possible to comparatively reduce the annealing temperature. On the other hand, annealing processing is carried out in inert gas atmosphere, thereby making it possible to prevent impurities from being introduced into the silicon oxide films 52 and 64 or another film from being formed on the surface of the silicon oxide films 52 and 64. In addition, there is no need to employ a vacuum device in order to carry out annealing processing. Thus, a simplified device can be employed as compared with a case in which the vacuum device is employed. As a result, throughput in a device for carrying out annealing processing can be improved, and the manufacturing cost can be reduced.

EXAMPLES

Hereinafter, a result obtained by variously changing a condition for the oxidization step based on the method of manufacturing a electron source 10 according to the tenth embodiment, thereby manufacturing the electron source 10, and then, measuring the electron emission characteristics will be described with reference to FIG. 19 to FIG. 25.

First, a common condition in a method of manufacturing each electron source 10 will be described.

As an n-type silicon substrate, there was employed a (100) substrate of 0.01 Ω cm to 0.02 Ω cm in resistivity and 525 μm in thickness. The film thickness of a polycrystalline silicon layer 3 (refer to FIG. 2A) was 1.5 μm. The film forming of the polycrystalline silicon layer 3 was carried out in accordance with an LPCVD technique. In the film forming step, the degree of vacuum was 20 Pa, the substrate temperature was 640° C., and the flow rate of mono-silane gas was 0.6 L/min (600 sccm) in a standard state. In the anodic oxidation processing step, as an electrolyte solution, there was employed an electrolytic solution obtained by mixing 55 wt % of hydrogen fluoride water solution and ethanol at substantially 1:1. During anodic oxidation, a 500 W lamp was employed as a light source. While light emission was carried out on the main surface of a polycrystalline silicon layer 3, 12.5 mA of constant current was supplied from a power source by a predetermined time between a lower electrode 12 that is an anode and a cathode consisting a platinum electrode. The surface electrode 7 was a gold thin film of 10 nm in film thickness formed in accordance with a vapor deposition technique.

Figure 19:
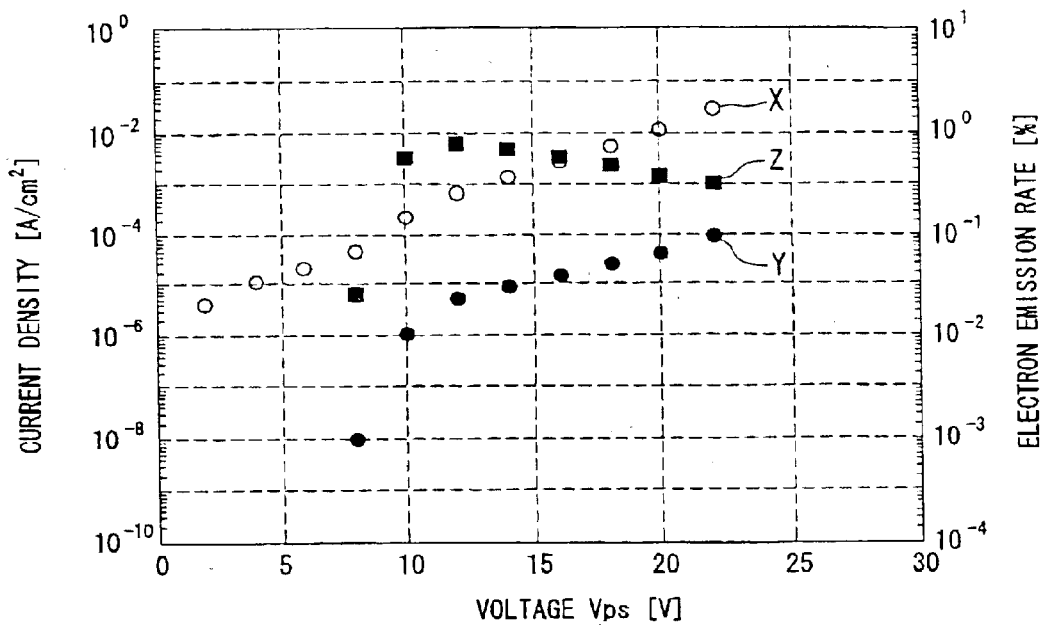
FIG. 19 is a view showing electron emission characteristics according to a tenth embodiment.

FIG. 19 shows a measurement result of an electron source (hereinafter, referred to as "electron source of first example") when an electrolytic solution obtained by dissolving 0.04 M of potassium nitrate (solute) was employed for ethylene glycol (organic solvent) in the manufacturing method according to the tenth embodiment.

Figure 20:
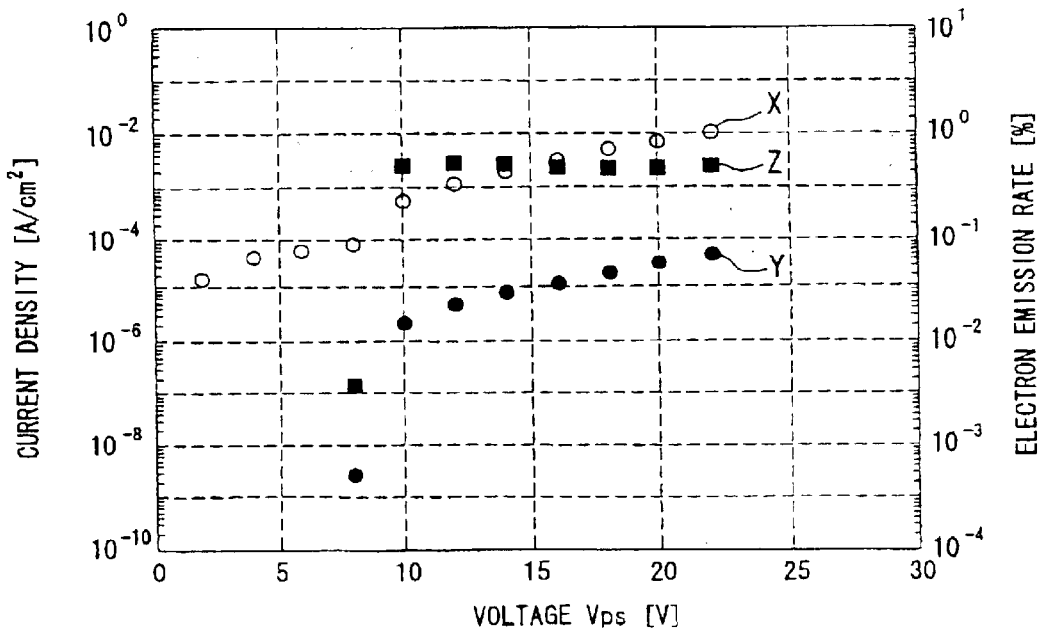
FIG. 20 is a view showing electron emission characteristics according to an eleventh embodiment.

FIG. 20 shows a measurement result of an electron source (hereinafter, referred to as "electron source of second example") when an electrolytic solution is employed, the electrolytic solution being obtained by dissolving 0.04 M of potassium nitrate (solute) in ethylene glycol (organic solvent), and further, adding 3 wt % of water thereto (namely, manufacturing method of the thirteenth embodiment) in the manufacturing method according to the tenth embodiment.

Figure 21:
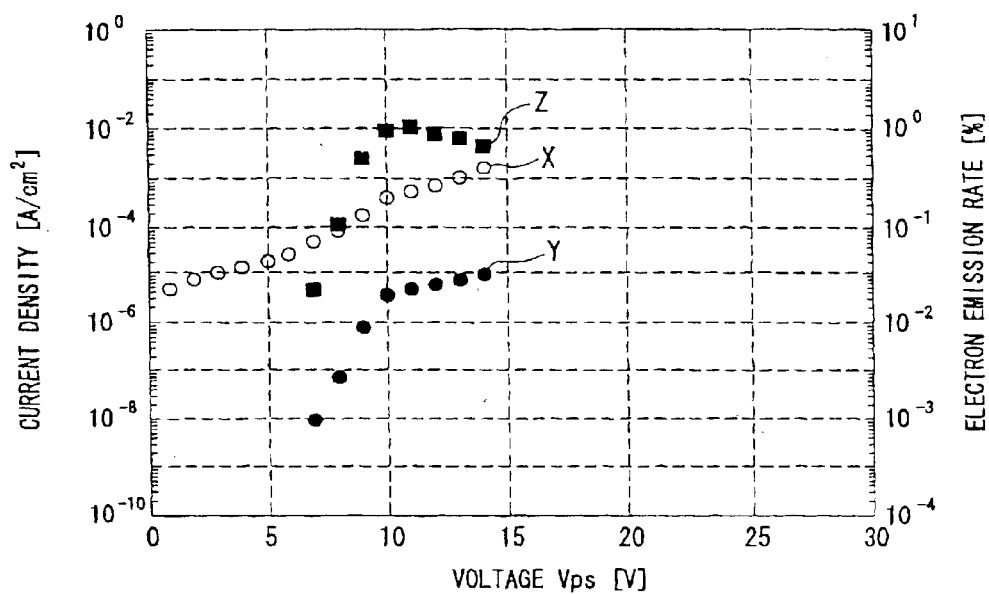
FIG. 21 is a view showing electron emission characteristics according to a twelfth embodiment.

FIG. 21 shows a measurement result of an electron source (hereinafter, referred to as "electron source of third example") when an electrolytic solution is employed, the electrolytic solution being obtained by dissolving 0.04 M of potassium nitrate (solute) in ethylene glycol (organic solvent), and further, adding 6 wt % of water thereto (namely, manufacturing method of the thirteenth embodiment) in the manufacturing method according to tenth embodiment.

Figure 22:
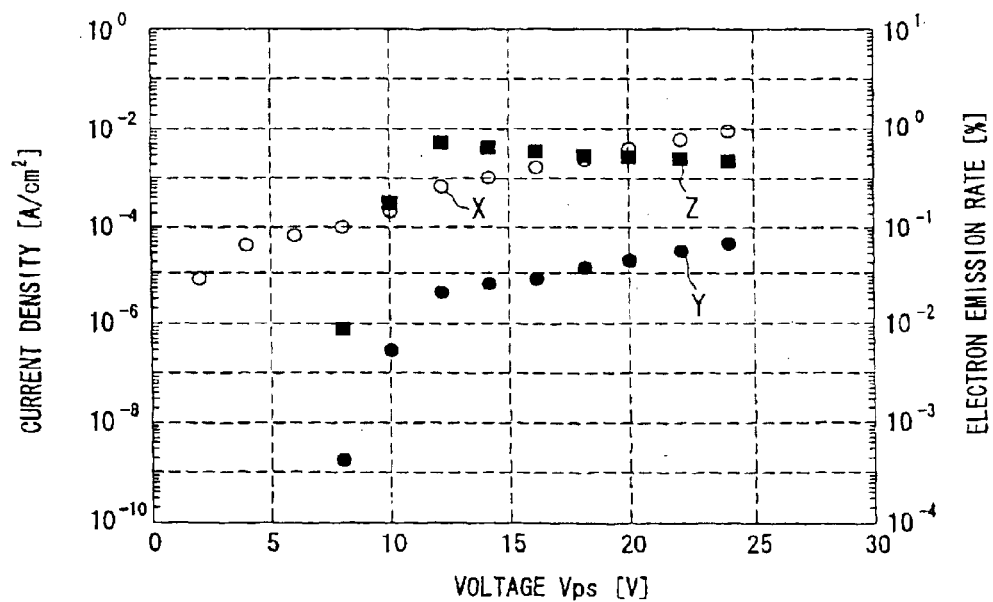
FIG. 22 is a view showing electron emission characteristics according to a thirteenth embodiment.

FIG. 22 shows a measurement result of an electron source hereinafter, referred to as "electron source-of fourth embodiment") when an electrolytic solution is employed, the electrolytic solution being obtained by dissolving 0.04 M of potassium nitrate (solute) in ethylene glycol (organic solvent), and further, adding 10 wt % of water thereto (namely, manufacturing method of the thirteenth embodiment).

Figure 24:
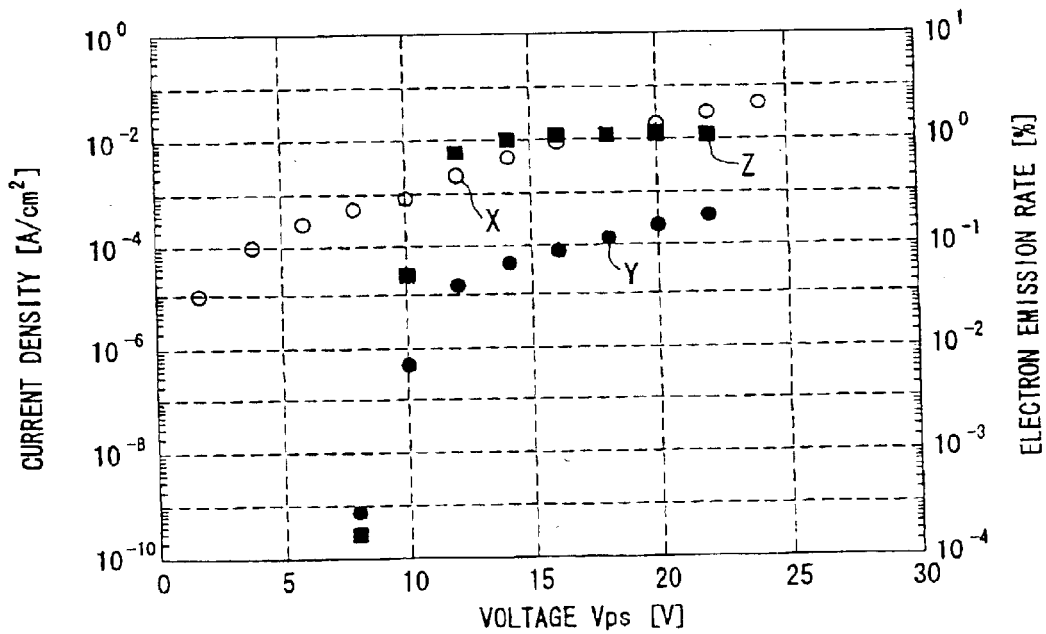
FIG. 24 is a view showing electron emission characteristics of the electron source according to a fourteenth embodiment.

FIG. 24 shows a measurement result of an electron source (hereinafter, referred to as "electron source of fifth example") when, in the manufacturing method according to the tenth embodiment, electrochemical oxidization is carried out by employing an electrolytic solution obtained by dissolving 0.04 M of potassium nitrate (solute) for ethylene glycol (organic solvent), and then, annealing processing is carried out for 1 hour at an annealing temperature of 500° C. (namely, manufacturing method of the fourteenth embodiment).

Figure 25:
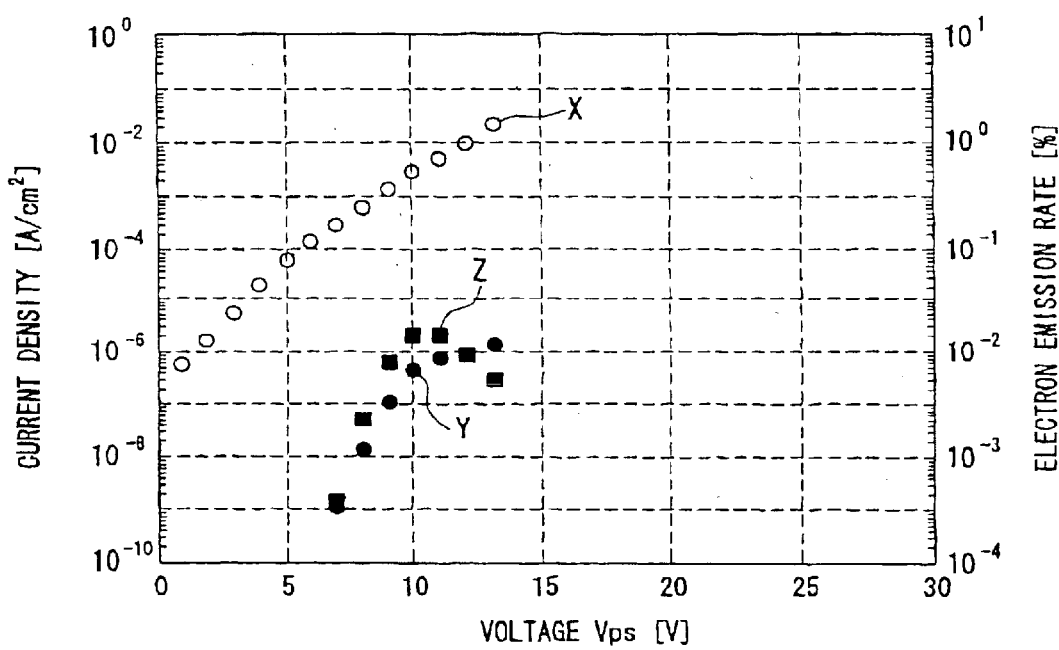
FIG. 25 is a view showing electron emission characteristics of an electron source of Comparative Example.
Figure 26:
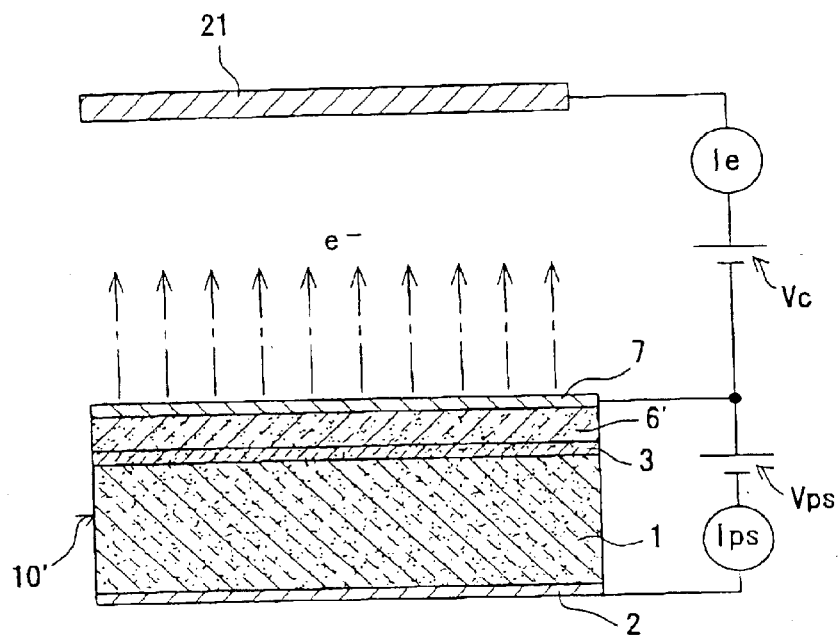
FIG. 26 is a view showing an operation of a conventional electron source.
Figure 27:
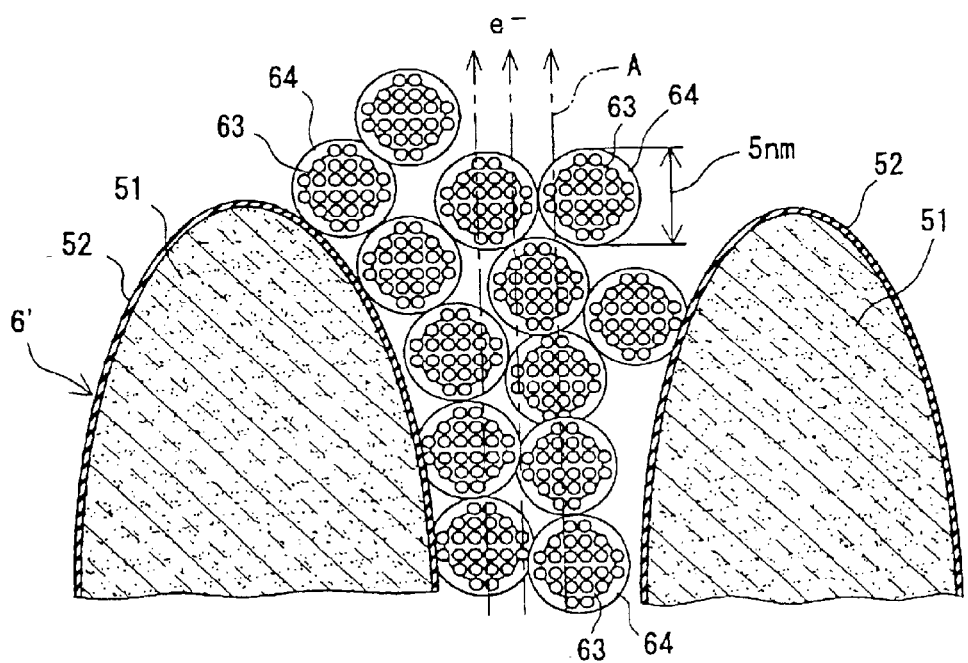
FIG. 27 is a view showing an electron emitting operation of the conventional electron source.
Figure 28:
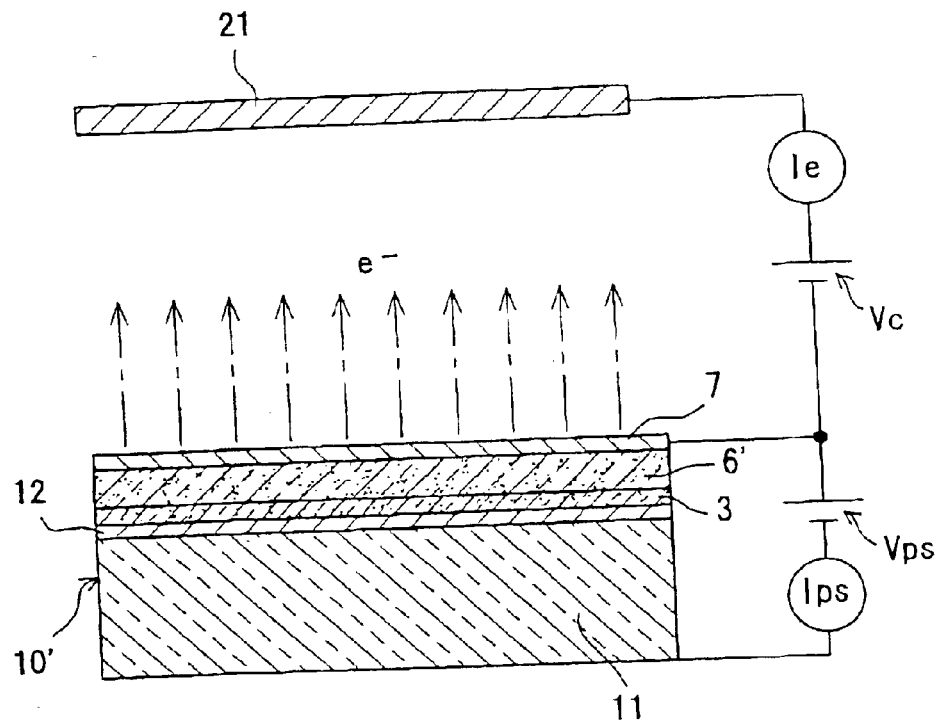
FIG. 28 is a view an operation of another conventional electron source.
Figure 29:
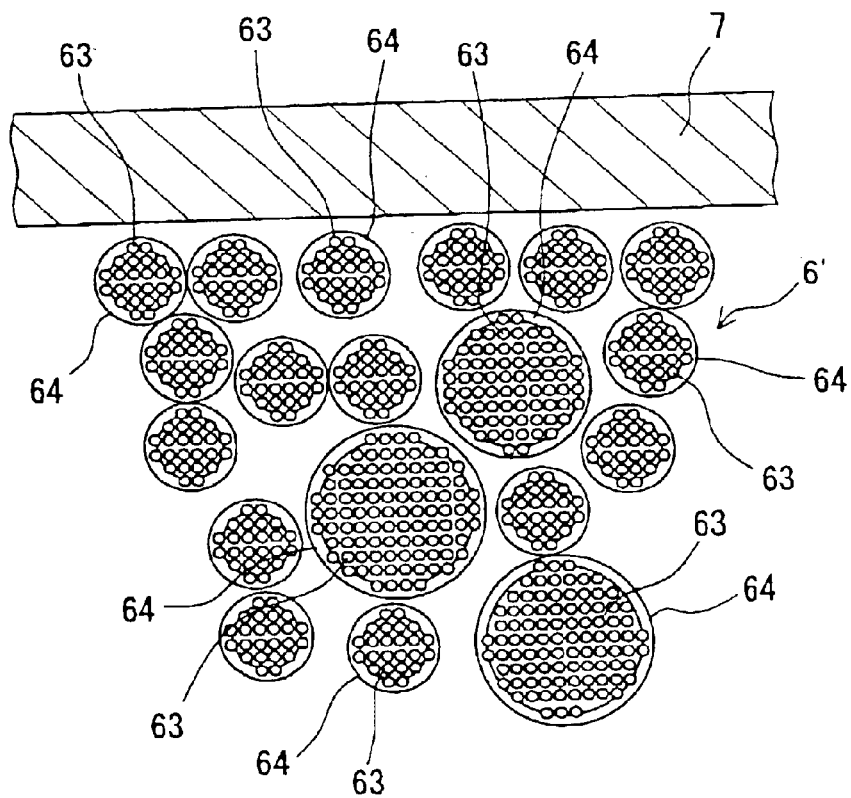
FIG. 29 is a view showing a general construction of essential portions of the electron source shown in FIG. 26.

FIG. 25 shows a measurement result of an electron source (hereinafter, referred to as "electron source of comparative example") when 1 M of sulfuric acid water solution is employed as an electrolytic solution.

Figure 23:
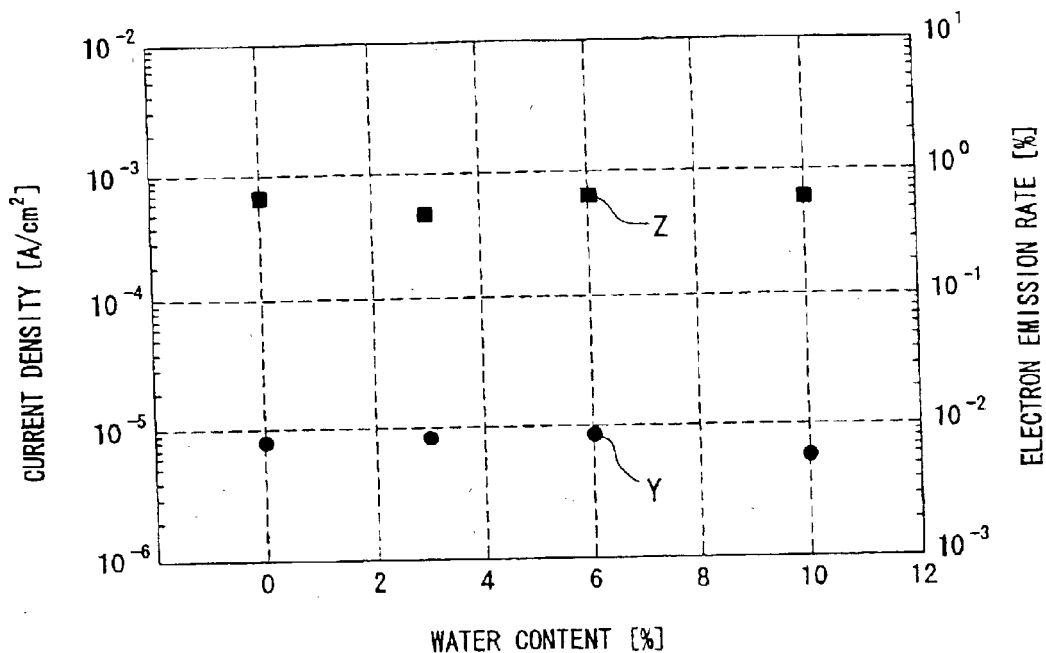
FIG. 23 is a view showing a comparison of electron emission characteristics of the electron source according to the tenth to thirteenth embodiments.

FIG. 23 compares measurement results of FIG. 19 to FIG. 22.

The electron emission characteristics of each electron source was measured in accordance with the following procedures. That is, an electron source was introduced into a vacuum chamber (not shown). As shown in FIG. 3, a collector electrode 21 was disposed in opposite to a surface electrode 7. A direct current voltage Vps was applied so that the surface electrode 7 is high in potential relevant to the lower electrode Furthermore, the direct current voltage Vc was applied so that the collector electrode 21 is high in potential relevant to the surface electrode 7.

FIG. 19 to FIG. 22 and FIG. 24 and FIG. 25 each show a measurement result of electron emission characteristics when a direct current voltage Vc is constant at 100 V, and the degree of vacuum in a vacuum chamber is $5 \times 10^{-5}$ Pa. The horizontal axis of each figure denotes a direct current voltage Vps. The vertical axis of the left side denotes a current density. The vertical axis of the right side represents electron emission efficiency. X denotes a current density of a diode current Ips. Y denotes a current density of an emission current Ie. Z denotes electron emission efficiency.

In addition, FIG. 23 is a graph depicting data when a direct current voltage Vps is 14V in measurement results of FIG. 19 to FIG. 22. The horizontal axis of FIG. 23 denotes the water content at a mass rate. The vertical axis of the left side denotes a current density. The vertical axis of the right side denotes electron emission efficiency. Y denotes a current density of an emission current Ie. Z denotes electron emission efficiency.

From FIG. 19 to FIG. 24 and FIG. 25, it is found that the electron sources of first to fifth examples are improved respectively in current density and electron emission efficiency of the emission current Ie, as compared with those of comparative examples.

The present invention has been described in connection with its specific embodiments. It would have been obvious to one skilled in the art that a number of various modifications and alternations can occur. Therefore, the present invention should be limited by the accompanying claims without being limited by such embodiments.

What is claimed is:

1. A method of manufacturing a field emission type electron source having an electrically conductive substrate, a strong field drift layer formed on one surface of the electrically conductive substrate, and an electrically conductive thin film formed on the strong field drift layer, wherein a voltage is applied so that the electrically conductive thin film becomes positive in polarity relevant to the electrically conductive substrate, whereby electrons injected from the electrically conductive substrate into the strong field drift layer drift within the strong field drift layer and are emitted through the electrically conductive thin film, said method comprising:

an anodic oxidation processing step of, when the strong field drift layer is formed, forming a porous semiconductor layer which contains a semiconductor nanocrystal by anodic oxidation; and an insulating film forming step of forming an insulating film on the surface of each semiconductor nanocrystal, wherein, in said anodic oxidation processing step, anodic oxidation processing is carried out while emitting light which primarily contains a wavelength in a visible light region relevant to a semiconductor layer.

2. The method according to claim 1, wherein the wavelength of light emitted to the semiconductor layer is restricted by an optical filter.

3. The method according to claim 2, wherein the optical filter is composed of at least one of an infrared cutting filter and a ultraviolet ray cutting filter.

4. The method according to claim 1, wherein the wavelength of light emitted to the semiconductor layer is set at a wavelength formed when semiconductor nanocrystals are continuously connected to each other.

5. The method according to claim 1, wherein a light source of a monochromatic light is employed.

6. The method according to claim 1, wherein the wavelength of light emitted to the semiconductor layer is changed based on an elapse of time after starting anodic oxidation.

7. The method according to claim 2, wherein a transmission wavelength of the optical filter is changed based on an elapse of time after starting anodic oxidation.

8. The method according to claim 1, wherein light is intermittently emitted to the semiconductor layer.

9. The method according to claim 1, wherein light is emitted to the semiconductor layer from an opposite side to said surface of the semiconductor layer.

10. The method according to claim 9, wherein light is emitted from both sides in the thickness direction of the semiconductor layer, and is changed in synchronism with the wavelengths of both lights.

11. The method according to claim 1, wherein there is employed a control means of, in the anodic oxidation processing step, controlling a concentration of an electrolytic solution in an anodic oxidation processing vessel so as to proceed forming of a porous semiconductor layer at a same velocity.

12. The method according to claim 11, wherein the control means utilizes a controlling vessel for introducing an electrolytic solution having its temperature and concentration adjusted into the anodic oxidation processing vessel.

13. The method according to claim 11, wherein the control means finely moves a target comprising a lower electrode and a semiconductor layer.

14. The method according to claim 1, wherein a rinse step of removing an electrolytic solution that remains in the porous semiconductor layer by employing at least a hydrophilic organic solvent is included between said anodic oxidation processing step and said insulating film forming step.

15. The method according to claim 1, wherein said rinse step of removing an electrolytic solution which remains in the porous semiconductor layer by employing at least a non-water soluble organic solvent is included between said anodic oxidation processing step and said insulating film forming step.

16. The method according to claim 1, wherein, during a specified period between said anodic oxidation processing step and said oxidization processing step, a natural oxide film is prevented from being formed on a semiconductor nanocrystal surface so as not to expose the porous semiconductor layer to an air.

17. The method according to claim 16, wherein, during the specified period, a surface of the porous semiconductor layer is covered with a non-oxide liquid.

18. The method according to claim 16, wherein, during the specified period, an atmosphere is inert gas.

19. The method according to claim 16, wherein, during the specified period, at least a porous semiconductor layer is held in a vacuum.

20. The method according to claim 1, wherein said insulating film forming step contains a main oxidation processing step of electrochemically oxidizing the porous semiconductor layer in the electrolytic solution obtained by dissolving a solute in an organic solvent.

21. The method according to claim 20, wherein water is added to the electrolytic solution.

22. The method according to claim 20, wherein an auxiliary oxidation processing step of oxidizing the porous semiconductor layer in accordance with a thermal oxidizing technique is included at least before or after said main oxidization processing step.

23. The method according to claim 20, a pre-oxidization processing step of oxidizing the porous semiconductor layer is included before said main oxidization processing step.

24. The method according to claim 22, wherein a pre-oxidization processing step of oxidizing the porous semiconductor layer is included before said main oxidization processing step and said auxiliary oxidization processing step.

25. The method according to claim 20, wherein a wash step of washing the porous semiconductor layer is included after said main oxidization processing step.

26. An apparatus for manufacturing a field emission type electron source having an electrically conductive substrate, a strong field drift layer formed on one surface of the electrically conductive substrate, and an electrically conductive thin film formed on the strong field drift layer, wherein a voltage is applied so that the electrically conductive thin film becomes positive in polarity relevant to the electrically conductive substrate, whereby electrons injected from the electrically conductive substrate into the strong field drift layer drift within the strong field drift layer and are emitted through the electrically conductive thin film, said apparatus comprising:

an anodic oxidation processing device for, when the strong field drift layer is formed, forming a porous semiconductor layer which contains a semiconductor nanocrystal in accordance with anodic oxidation; and an insulating film forming device for forming an insulating film on the surface of each semiconductor nanocrystal, wherein the anodic oxidation processing device carries out anodic oxidation processing while emitting light that essentially contains a wavelength of a visible light region relevant to the semiconductor layer.

* * * * *